United States Patent [19]

Kaneshima et al.

[11] Patent Number: 5,319,119
[45] Date of Patent: Jun. 7, 1994

[54] OLEOPHILIC MOLYBDENUM COMPOUND FOR USE IN HYDROCONVERSION OF A HYDROCARBON AND A METHOD FOR PRODUCING THE SAME

[75] Inventors: Tokitaka Kaneshima; Takashi Takahashi; Kazuhiro Matsubara, all of Kurashiki, Japan

[73] Assignee: Asahi Kasei Kogyo Kabushiki Kaisha, Osaka, Japan

[21] Appl. No.: 849,683

[22] Filed: Mar. 11, 1992

[30] Foreign Application Priority Data

Mar. 15, 1991 [JP] Japan ................................. 3-74192

[51] Int. Cl.$^5$ ............... C07F 11/00; C07F 9/00; C07F 9/06
[52] U.S. Cl. .................................... 556/14; 556/17; 556/24; 556/28; 556/30; 556/57
[58] Field of Search ................. 556/57, 14, 17, 24, 556/28, 30

[56] References Cited

U.S. PATENT DOCUMENTS

| | | | |
|---|---|---|---|
| 4,134,825 | 1/1979 | Bearden, Jr. et al. | 208/108 |
| 4,196,072 | 4/1980 | Aldridge et al. | 208/10 |
| 4,406,839 | 9/1983 | Kroenke et al. | 260/429 R |
| 4,406,840 | 9/1983 | Kroenke | 260/429 R |
| 4,425,279 | 1/1983 | Kroenke | 260/429 R |
| 4,431,520 | 2/1984 | Giuliani et al. | 208/112 |
| 4,606,809 | 8/1986 | Garg | 208/59 |
| 4,637,870 | 1/1987 | Bearden, Jr. et al. | 208/112 |
| 4,637,871 | 1/1987 | Bearden, Jr. et al. | 208/112 |
| 4,780,553 | 10/1988 | Suzuki et al. | 556/26 |
| 4,863,887 | 9/1989 | Ohtake et al. | 502/150 |

*Primary Examiner*—Joseé G. Dees
*Assistant Examiner*—Porfirio Nazario
*Attorney, Agent, or Firm*—Birch, Stewart, Kolasch & Birch

[57] ABSTRACT

An oleophilic molybdenum compound comprising an aliphatic amine group and a heteropolyanion group containing at least one molybdenum atom as a polyatom is disclosed. The oleophilic molybdenum compound is a catalyst precursor capable of being changed, in the hydroconversion reaction system, to a catalyst having excellent catalytic activity in hydroconversion of a hydrocarbon feedstock to a hydrocarbon product having a decreased molecular weight. The oleophilic molybdenum compound is efficiently produced from an aliphatic amine and a heteropolyacid.

10 Claims, 22 Drawing Sheets

OLEOPHILIC MOLYBDENUM COMPOUND FOR USE IN HYDROCONVERSION OF A HYDROCARBON AND A METHOD FOR PRODUCING THE SAME

BACKGROUND OF THE INVENTION

1. Field of the Invention

The present invention relates to an oleophilic molybdenum compound for use in hydroconversion of a hydrocarbon, and a method for producing the same. More particularly, the present invention is concerned with a novel oleophilic molybdenum compound comprising an aliphatic amine group and a heteropolyanion group, which compound is a catalyst precursor capable of being changed, in the hydroconversion reaction system, to a catalyst having excellent catalytic activity in hydroconversion of a hydrocarbon feedstock to a hydrocarbon product having a decreased molecular weight. The present invention is further concerned with a method for efficiently producing the novel oleophilic molybdenum compound from an aliphatic amine and a heteropolyacid.

2. Discussion of Related Art

A hydroconversion is now widely being conducted, in which a hydrocarbon feedstock, particularly a feedstock of a heavy hydrocarbon, such as heavy crude oil, distillation residual oil, tar sand extract oil, shale oil and coal, is converted to a light hydrocarbon having a low molecular weight. In the hydroconversion of a hydrocarbon feedstock, first, the hydrocarbon is thermally cracked to form hydrocarbon radicals. These hydrocarbon radicals are favorably bonded with hydrogen atoms to produce a hydrocarbon having a decreased molecular weight. At the same time, polycondensation of these radicals unfavorably occurs to produce polycondensates, such as coke and asphaltene. These polycondensates are likely to remain in a reaction apparatus, especially in a reaction zone of the apparatus, to thereby cause coking and choking phenomena which hinder the advancement of the hydroconversion reaction. Various catalysts have been proposed, which are expected to exert various activities, including not only an activity of suppressing the above-mentioned unfavorable polycondensation of hydrocarbon radicals while suppressing extreme generation of gases, such as methane, ethane, propane and butane, but also an activity of simultaneously attaining a content decrease with respect to heteroatoms, such as atoms of sulfur, nitrogen and oxygen, heavy metals, such as vanadium and nickel, and ash as contained in the hydrocarbon feedstock and an activity of attaining a hydrogenation of a hydrocarbon so as to modify the properties of the hydrocarbon. These activities of the catalyst are hereinafter frequently referred to simply as "hydroconversion activities".

The conventional reaction systems for the hydroconversion of a heavy oil are classified into three types, i.e., a fixed bed reaction system, an ebullated bed reaction system and a dispersion (suspension) reaction system, depending on how the catalyst is used. Of these, a dispersion reaction system, in which a dispersible metal compound is added as a hydroconversion catalyst or as a precursor thereof to a hydrocarbon feedstock, is preferred from the viewpoint of its suitability for effective hydroconversion of a heavy hydrocarbon feedstock. Accordingly, a large variety of dispersible metal compounds have been proposed for use in the dispersion reaction system.

Most of such dispersible metal compounds contain a metal element selected from transition metal elements of Group V, Group VI and Group VIII of the periodic table. In particular, the most representative element contained in such dispersible metal compounds is a molybdenum element capable of exerting a high catalytic activity in the form of a sulfide or a sulfide-like compound when it is incorporated in a hydrocarbon reaction system. Further, various proposals have been made with respect to the molybdenum compounds which are added as a catalyst precursor to a hydrocarbon feedstock. The proposed catalyst precursors include a heteropolyacid containing molybdenum atoms as polyatoms.

U.S. Pat. Nos. 4,134,825, 4,431,520 and 4,606,809 discloses proposals, in which a heteropolyacid containing molybdenum atoms as polyatoms is used in the same way as other metal compounds for the hydroconversion of a hydrocarbon. Further, U.S. Pat. Nos. 4,196,072, 4,637,870 and 4,637,871 disclose the use of a heteropolyacid containing molybdenum or tungusten atoms as polyatoms, optionally together with phosphoric acid. In these U.S. patents, the heteropolyacid is added in the form of a solid or an aqueous solution.

Moreover, U.S. Pat. No. 4,770,764 discloses an additive obtained by mixing an aqueous heteropolyacid solution with a powdery carbonaceous substance in the anticipation that a high dispersion of the heteropolyacid in a hydrocarbon oil is attained by virtue of the activity of the carbonaceous substance powder as a carrier.

The heteropolyacid containing molybdenum atoms as polyatoms is a characteristic cluster compound having a single anion structure. In view of this structure, it can be anticipated that the heteropolyacid is suitable for use as a molybdenum catalyst precursor. However, despite such anticipation, the heteropolyacid is hydrophilic and oleophobic, so that it has high solubility in a hydrophilic solvent, such as water, an alcohol and an ether, but it is insoluble in a hydrocarbon oil. Therefore, it is difficult to attain a high dispersion of the heteropolyacid in a hydrocarbon feedstock only by adding to the hydrocarbon feedstock the heteropolyacid in the form of a solid or a solution thereof in a hydrophilic solvent. As a result, the hydroconversion activity of the heteropolyacid is unsatisfactory in the dispersion reaction system.

Despite the above various proposals hitherto made, any stable, continuous flow process which is completely satisfactory from the technical and practical viewpoints, has not yet been realized in the hydroconversion of a heavy hydrocarbon to a more valuable light hydrocarbon at a high conversion ratio, for example, a hydroconversion of a feedstock of vacuum distillation residual oil having a boiling point of 538° C. (1000° F.) or above to a hydrocarbon fraction having a boiling point of lower than 538 ° C. at a conversion ratio as high as 80%. The reason for the non-realization of such a continuous flow process is that when a hydroconversion at a high conversion ratio is attempted, the amount of polycondensates, such as coke and asphaltene, formed by side reactions is increased so that coking and choking phenomena attributed to adhesion and deposition of a portion of the polycondensates inside a reaction apparatus, particularly a reaction zone of the apparatus become extreme, and that effective measures have not been found for the suppression of such coking and choking phenomena.

SUMMARY OF THE INVENTION

The present inventors have considered that the problems of the prior art occur mainly due to the properties of a catalyst. Further, they have considered that a desirable catalyst is a dispersible (suspendable) catalyst capable of exhibiting high catalytic activities even when it is used in a small amount, and must not be a catalyst obtainable by complicated processes or highly expensive processes since it is generally thrown away after use as recycling thereof is infeasible. In line with this consideration, the present inventors have made extensive and intensive studies. As a result, the present inventors have surprisingly found that a readily obtainable molybdenum compound comprising a specific aliphatic amine group and a heteropolyanion group is highly dispersible in a hydrocarbon feedstock and is a desired precursor changeable in a reaction system to a catalyst having excellent catalytic activity in hydroconversion of the hydrocarbon. The present invention has been made on the basis of this novel finding.

Accordingly, it is an object of the present invention to provide an oleophilic molybdenum compound changeable in a reaction system to a catalyst having excellent hydroconversion activities as defined above.

It is another object of the present invention to provide a method for efficiently producing the abovemetioned oleophilic molybdenum compound.

The foregoing and other objects, features and advantages of the present invention will be apparent from the following detailed description and appended claims taken in connection with the accompanying drawings.

DETAILED DESCRIPTION OF THE INVENTION

Figure 1:
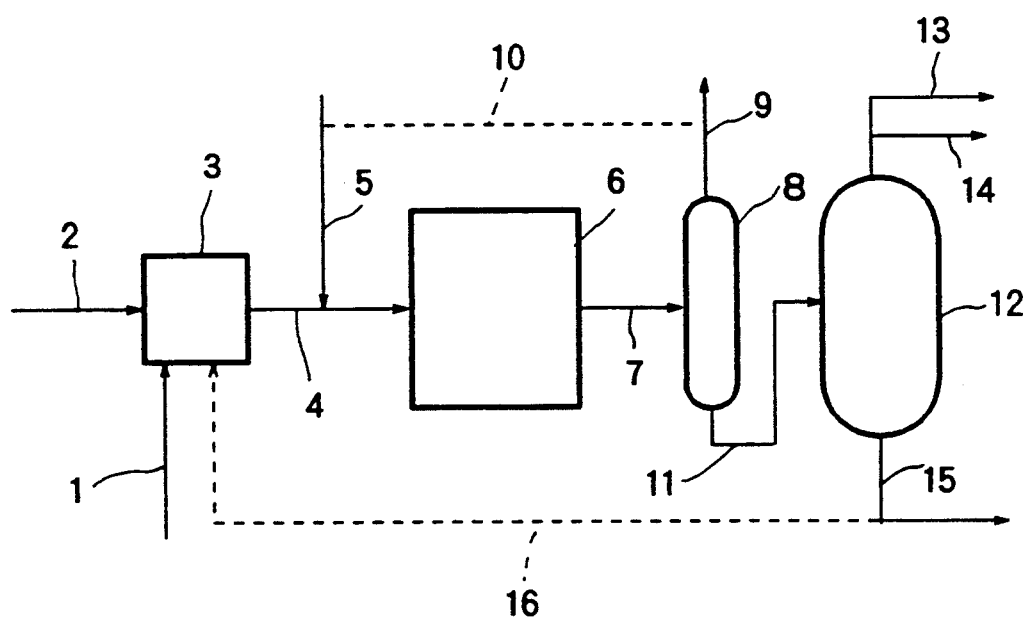
FIG. 1 is a flow chart illustrating one form of a flow reactor system for continuously practicing a hydroconversion by the use of an oleophilic molybdenum compound according to the present invention.

In one embodiment of the present invention, there is provided an oleophilic molybdenum compound for use in hydroconversion of a hydrocarbon, represented by the formula:

$$[(R^1)(R^2)(R^3)NH]_xH_y[A] \qquad (I)$$

wherein $R^1$ represents an aliphatic hydrocarbon residue having 10 to 46 carbon atoms, each of $R^2$ and $R^3$ independently represents a hydrogen atom or an aliphatic hydrocarbon residue having 1 to 46 carbon atoms, A represents a heteropolyanion group containing at least one molybdenum atom as a polyatom, x is an integer of from 3 to 14, and y is an integer of from 0 to 11.

As defined above, in formula (I), A represents a heteropolyanion group containing at least one molybdenum atom as a polyatom. Hereinafter, the heteropolyanion group is frequently referred to as "heteropolymolybdate anion group". Various forms of heteropolymolybdate anion groups are known, which include an acid form and a metal salt form. The heteropolymolybdate anion group as a component of the oleophilic molybdenum compound of the present invention include such various known forms of heteropolymolybdate anion groups. The heteropolymolybdate anion group represented by A in formula (I) is formed by condensation of an oxygen acid of molybdenum (polyatom) with an element of Groups I to VIII of the periodic table as a central atom (hetero atom). There are various heteropolymolybdate anions having different condensation ratios (ratio of the number of heteroatoms to the number of polyatoms, e.g., from 2.5 to 12). Each of the heteropolymolybdate anions has a distinct, single crystal structure with an intra-crystal arrangement, and it is in the form of a characteristic cluster anion having a size of from 6 to 25 angstroms and a molecular weight of from $10^3$ to $10^4$. With respect to the heteropolymolybdate anions as used in the present invention, reference is made to "Heteropoly and Isopoly Oxometalates", M. T. Pope, Springer-Verlag (1983).

Representative examples of heteropolymolybdate anions as a component of the oleophilic molybdate compound of the present invention include a phosphorus polymolybdate anion, a silicon polymolybdate anion, a germanium polymolybdate anion, a cerium polymolybdate anion, an arsenic polymolybdate anion, a cobalt polymolybdate anion, a nickel polymolybdate anion, and a manganese polymolybdate anion. The polyatoms contained in these heteropolymolybdate anions are molybdenum atoms. The heteropolymolybdate anions for use in the present invention are not limited to these anions, and include mixed heteropolymolybdate anions (corresponding to a heteropolymolybdate anion having some of the molybdenum atoms replaced by non-molybdenum transition metal atoms) each containing at least one molybdenum atom and at least one transition metal atom as polyatoms as long as the ratio of the number of molybdenum atoms to the total number of polyatoms is at least 0.7. Representative examples of mixed heteropolymolybdate anions include a phosphorus polymolybdotungstate anion, a phosphorus polymolybdovanadate anion, a phosphorus polymolybdoniobate anion, a silicon polymolybdotungstate anion, a silicon polymolybdovanadate anion, a silicon polymolybdotungstovanadate anion, a germanium polymolybdotungstate anion, a germanium polymolybdovanadate anion, and a germanium polymolybdotungstovanadate anion, in which the ratio of the number of molybdenum atoms to the total number of polyatoms is at least 0.7. A preferred example of such mixed heteropolymolybdate anions is a mixed heteropolymolybdate anion of Keggin structure having one heteroatom and twelve polyatoms and represented by the formula:

$$XMo_{12-m}M_mO_{40}$$

wherein X represents a heteroatom, M represents at least one atom selected from the group consisting of a tungsten atom and a vanadium atom, and m is an integer of from 1 to 3.

Most of the above-mentioned heteropolymolybdate anions are likely to be reduced to form for example, 2-, 4- or 6-electron reduced species. For example, a phosphorus polymolybdate anion of Keggin structure having a phosphorus atom as a heteroatom and represented by the formula $[PMo_{12}O_{40}]^{-3}$ is reduced to form $[PMo_{12}O_{40}]^{-5}$ (2-electron reduced species), $[PMo_{12}O_{40}]^{-7}$ (4-electron reduced species) or $[PMo_{12}O_{40}]^{-9}$ (6-electron reduced species). Such 2-, 4- or 6- electron reduced species can also be used in the present invention. The above-mentioned reduced species of the heteropolymolybdate anion may be obtained by a customary electolytic reduction method or a customary chemical reduction method in which various reducing agents are used.

In formula (I), $[(R^1)(R^2)(R^3)NH]$ is an aliphatic amino cation group, in which $R^1$ represents an aliphatic hydrocarbon residue having 10 to 46 carbon atoms, preferably 10 to 30 carbon atoms, more preferably 12 to 30 carbon atoms, and each of $R^2$ and $R^3$ independently represents a hydrogen atom or an aliphatic hydrocarbon residue having 1 to 46 carbon atoms, preferably 1 to 30 carbon atoms. The above-mentioned aliphatic hydrocarbons of $R^1$, $R^2$ and $R^3$ may be a straight or branched chain, may be saturated or unsaturated, and may be alicyclic.

Representative examples of aliphatic hydrocarbon residues represented by $R^1$ include a decyl group, an undecyl group, a dodecyl (lauryl) group, a tridecyl group, a tetradecyl group, a pentadecyl group, a hexadecyl (cetyl) group, a heptadecyl group, an octadecyl (stearyl) group, an oleyl group, an octadecadienyl group, an eicosyl group, a docosyl group, a heneicosyl group, a tricosyl group, a tetracosyl group, a pentacosyl group, a hexacosyl group, a heptacosyl group, an octacosyl group, a nonacosyl group and a triacontyl group. Representative examples of aliphatic hydrocarbon residues represented by $R^2$ and $R^3$ include the groups set forth above as representative examples of aliphatic hydrocarbon residues represented by $R^1$ and further a methyl group, an ethyl group, a propyl group, an isopropyl group, a butyl group, a sec-butyl group, an isobutyl group, a tert-butyl group, a butenyl group, a pentyl group, an isopentyl group, a tert-pentyl group, a neopentyl group, a hexyl group, an isohexyl group, a heptyl group, an octyl group and a nonyl group.

The aliphatic amino cation groups are classified into three types, depending on whether each of $R^2$ and $R^3$ is a hydrogen atom or not. That is, they are classified into $[(R^1)NH_3]$ corresponding to a primary amine, $[(R^1)(R^2)NH_2]$ (wherein $R^2$ is not a hydrogen atom) corresponding to a secondary amine and $[(R^1)(R^2)(R^3)NH]$ (wherein each of $R^2$ and $R^3$ is not a hydrogen atom) corresponding to a tertiary amine. Of these, each of $[(R^1)(R^2)NH_2]$ and $[(R^1)(R^2)(R^3)NH]$ may be a symmetric amino group in which all of the aliphatic hydrocarbon residues are identical, or an asymmetric (mixed) amino group in which the aliphatic hydrocarbon residues are not identical.

Molybdenum compounds individually having one of the above aliphatic amino cation groups may be classified into two types, depending on the oleophilicity with a hydrocarbon oil. That is, one type includes molybdenum compounds which have high solubility in a hydrocarbon oil so as to be dissolved therein, the molybdenum compounds being selected from the group consisting of $[(R^1)(R^2)NH_2]_xH_y[A]$, in which A, $R^1$ x and y are as defined above and $R^2$ represents an aliphatic hydrocarbon residue having 10 to 46 carbon atoms, and $[(R^1)(R^2)(R^3)NH]_xH_y[A]$, in which A, $R^1$, x and y are as defined above, $R^2$ is an aliphatic hydrocarbon residue having 10 to 46 carbon atoms and $R^3$ is as defined above. The other type includes molybdenum compounds which have less solubility in a hydrocarbon oil so as to form a suspension (colloid) and which are selected from the other molybdenum compounds of the present invention. The former type is preferred in both the manufacturing phase and the application phase of the molybdenum compounds.

The oleophilic molybdenum compound of the present invention can be efficiently produced from an aliphatic amine or a salt thereof and a heteropolyacid or a metal salt thereof.

Accordingly, in another embodiment of the present invention, a method for producing an oleophilic molybdenum compound for use in hydroconversion of a hydrocarbon, represented by the formula:

$$[(R^1)(R^2)(R^3)NH]_xH_y[A] \qquad (I)$$

wherein $R^1$ represents an aliphatic hydrocarbon residue having 10 to 46 carbon atoms, each of $R^2$ and $R^3$ independently represents a hydrogen atom or an aliphatic hydrocarbon residue having 1 to 46 carbon atoms, A represents a heteropolyanion group containing at least one molybdenum atom as a polyatom, x is an integer of from 3 to 14, and y is an integer of from 0 to 11, is provided, which method comprises reacting an aliphatic amine of the formula:

$$(R^1)(R^2)(R^3)N \qquad (II)$$

wherein $R^1$, $R^2$ and $R^3$ are as defined above, or a salt thereof,
with a heteropolyacid of the formula:

$$H_xA \qquad (III)$$

wherein A and x are as defined above, or a metal salt thereof,
in a hydrocarbon oil.

The above heteropolyacid is hereinafter frequently referred to as "heteropolymolybdic acid". The heteropolymolybdic acid or the metal salt thereof may be used in the form of a solid (crystal) or a solution in a solvent. The solution is preferred from the viewpoint of easy handling. When the heteropolymolybdic acid or the metal salt thereof is in the form of a solid (crystal), it generally has 10–40 coordinated water (crystal water) molecules per heteropolymolybdate anion. With respect to the amount of the coordinated water, there is no particular limitation. When the heteropolymolybdic acid or the metal salt thereof is used in the form of a solution, it is dissolved in a solvent, such as water and hydrophilic solvents containing an oxygen atom, e.g., lower alcohols, ethers, ketones and the like.

The heteropolymolybdic acid or the metal salt thereof can be produced by a process in which an inorganic oxyacid or a salt thereof for forming a heteroatom and a molybdenum oxide or a molybdate salt for forming a polyatom are heated in water to thereby attain a polycondensation thereof. The thus obtained product solution can be used in the method for producing the molybdenum compound according to the present invention, without solid (crystal) separation steps or ion exchange steps. With respect to the production of the hereropolymolybdic acid or the metal salt thereof, reference is made to Ind. Eng. Chem., Prod. Res. Develop., pp 267–274, Vol. 13 No. 4 (1974).

As the hydrocarbon oil, various organic solvents can be used. Representative examples of such organic solvents include paraffinic solvents, such as hexane, heptane, octane and the like; naphthenic solvents, such as cyclohexane, methylcyclohexane and the like; and aromatic solvents, such as benzene, toluene, xylene, tetralin and the like. Of these, aromatic solvents are preferred because they have high solubility. Further, petroleum fractions, such as naphtha, kerosene, light oil, lubricating oil, heavy oil and the like, can also be used as the hydrocarbon oil. Moreover, the feedstock oil itself which is subjected to hydroconversion, can be used as the hydrocarbon oil.

The desired oleophilic molybdenum compound may be obtained in the form of a solution or a suspension in a hydrocarbon oil, as mentioned above. In the case where a suspension is obtained, it is preferred that a generally known disperser or wet type pulverizer capable of generating a high shearing force be used in the manufacturing (synthesis) stage so as to attain a high dispersion of the molybdenum compound. This does not apply when a solution is obtained.

In the manufacturing of the oleophilic molybdenum compound in the form of a suspension, a surfactant may be added as an auxiliary for promoting the dispersion of the molybdenum compound into the hydrocarbon oil. Representative examples of such surfactants include petroleum sulfonates, aliphatic amides, naphthenates, alkyl sulfosuccinates, alkyl phosphates, esters of aliphatic acid with polyoxyethylene, esters of aliphatic acid with polyoxyethylenesorbitan, esters of aliphatic acid with glycerol, esters of aliphatic acid with sorbitan and ammonium polycarboxylate-type polymeric surfactants.

In the method for producing the oleophilic molybdenum compound according to the present invention, there is no particular limitation with respect to the proportion of the heteropolyacid or the metal salt thereof to the aliphatic amine or the salt thereof. However, in the case of the quantitative production of an oleophilic molybdenum compound from a hydrophilic heteropolymolybdic acid or a metal salt thereof, it is preferred that the proportion be determined on the assumption that the acid-base reaction between a heteropolyacid or a metal salt thereof regarded as a polybasic acid in accordance with the valence of the heteropolyanion and an aliphatic amine or a salt thereof regarded as a monoacid base proceeds in stoichiometrical relationship. The aliphatic amine may be used in excess of the thus determined proportion. In this connection, it should be noted that when a salt of an aliphatic amine, such as a nitrate, a hydrochloride and a sulfate of an aliphatic amine, is employed, the use thereof in an excess amount does not contribute toward an advancement of the reaction, so that no change is observed with respect to the obtained oleophilic molybdenum compound. Therefore, the use of the salt in an excess amount has no significance. In contrast, when a primary, secondary or tertiary aliphatic amine is employed, the use thereof in an excess amount contributes toward an advancement of the reaction, so that the molybdenum compound undergoes changes in structure and composition. That is, up to the proportion corresponding to the stoichiometry of the acid-base reaction, it is likely that the anion structure of the heteropolymolybdic acid or the salt thereof is retained. On the other hand, when an aliphatic amine is employed in excess of the stoichiometric proportion, it is likely that the reduction of the anion is promoted and the original structure of the anion is decomposed to thereby change the ratio of the number of polyatoms to the number of heteroatoms so that a plurality of anions are present. This leads to the presence of a plurality of species in the desired molybdenum compound.

A difference is observed between a tertiary aliphatic amine on the one hand and a primary aliphatic amine and a secondary aliphatic amine on the other hand, as apparent from the following test. In a test in which the amount of a tertiary aliphatic amine is increased relative to a heteropolyacid, an amount is observed beyond which no further reaction proceeds between the amine and the heteropolyacid. On the other hand, in a test in which the amount of a primary or secondary aliphatic amine is increased, it is likely that the proportion of heteropolymolybdate anions having a ratio of the number of polyatoms to the number of heteroatoms changed from the original one and molybdate anions devoid of heteroatoms, are continuously increased.

The oleophilicity of the molybdenum compound may be increased by the use of an aliphatic amine in an excess amount. That is, in the case where an aliphatic amine having a small number of carbon atoms, for example, 10 to 14 carbon atoms is employed, only a molybdenum compound soluble in an aromatic solvent but sparingly soluble in a paraffinic solvent is obtained by the use of the amine in a stoichiometric amount. However, a molybdenum compound readily soluble in both an aromatic solvent and a paraffinic solvent is obtained by the use of the amine in an excess amount. In such a case, the use of the aliphatic amine in an excess amount brings about a desired change in the properties of the molybdenum compound. Judging from these facts, there is no upper limit with respect to the amount of the aliphatic amine utilized. However, the use of too much an amount of the amine is disadvantageous from a practical viewpoint and from the viewpoint that no further, desirable change can be expected with respect to the oleophilic molybdenum compound. Therefore, it is generally preferred that the proportion of the aliphatic amine to the heteropolyacid do not exceed the proportion corresponding to the presence of one molecule of aliphatic amine per molybdenum atom contained in the heteropolymolybdate anion.

When a quaternary ammonium compound of the formula $[(R^1)(R^2)(R^3)(R^4)N^+X^-]$ (wherein $R^1$ represents an aliphatic hydrocarbon residue having at least 10 carbon atoms, each of $R^2$, $R^3$ and $R^4$ represents independently an aliphatic hydrocarbon residue having at least one (as in methyl) carbon atom, and X represents an anion, such as a halogen anion and a hydroxy anion) is used as the aliphatic amine, a compound represented by the formula $[(R^1)(R^2)(R^3)(R^4)N][A]$ (wherein $R^1$, $R^2$, $R^3$ and $R^4$ are as defined above and A represents a heteropolymolybdate anion) is obtained. In the synthesis of the compound, as in the case of the use of a salt of a primary, secondary or tertiary aliphatic amine, the reaction proceeds in a quantitative relationship conforming to the assumption that the acid-base reaction between a heteropolyacid and a quaternary ammonium compound proceeds in a stoichiometrical relationship, and the use of the quaternary ammonium compound in an excess amount does not contribute toward the advancement of the reaction. Hence, the use of the quaternary ammonium compound in an excess amount has no significance. When the molybdenum compound having the quaternary ammonium cation is added to a hydrocarbon oil, a suspension is obtained. Further, when the molybdenum compound having the quaternary ammonium cation is employed in the hydroconversion of a hydrocarbon, it exhibits catalytic activities inferior to those of the molybdenum compound having an aliphatic amino cation according to the present invention.

With respect to the concentration of the oleophilic molybdenum compound in the hydrocarbon oil, when the oleophilic molybdenum compound is produced from a heteropolyacid and an aliphatic amine in a hydrocarbon oil, the oleophilic molybdenum compound is miscible with the hydrocarbon oil with no limitation as to their proportion. Therefore, higher concentrations of the oleophilic molybdenum compound are generally preferred because the amount of hydrocarbon oil is decreased to thereby render the scale of the production plant smaller. On the other hand, lower concentrations of the oleophilic molybdenum compound are preferred from the viewpoint of ensuring easy handling while maintaining the high fluidity of the hydrocarbon oil. In practice, an appropriate concentration of the molybdenum compound is chosen, taking into consideration the balance of the above-mentioned advantages of higher concentrations on the one hand and lower concentration on the other hand, and further taking into consideration the types of the heteropolyacid and the aliphatic amine, their proportion and the type of the hydrocarbon oil. Generally, it is preferred that the concentration of the oleophilic molybdenum compound in the hydrocarbon oil be within the range of from about 1 to about 20% by weight, in terms of the amount of molybdenum per se. In this connection, it is to be noted that when a feedstock oil to be subjected to hydroconversion is employed as the hydrocarbon oil, and when the oleophilic molybdenum compound is prepared in situ in the feedstock step for hydroconversion, the oleophilic molybdenum compound may preferably be produced in dilution, suitable for the addition to a feedstock oil for hydroconversion.

With respect to the operating temperature at which the oleophilic molybdenum compound is produced, the temperature is generally set at room temperature (20° C.) or higher, preferably 40° C. or higher, in order to facilitate the formation of the oleophilic molybdenum compound. As long as the operating temperature is set taking into consideration the boiling point and the fluid point of the feedstock hydrocarbon oil, there is no particular upper limit thereto. When a concentrated solution of the oleophilic molybdenum compound is produced, it is practical to employ a temperature of 150° C. or lower.

The period of time in which an aliphatic amine or a salt thereof is reacted with a heteropolyacid or a metal salt thereof, is not critical. However, it is generally in the range of from 5 minutes to 2 hours.

If a solution of the molybdenum compound in a hydrophilic solvent is employed, vaporization of the hydrophilic solvent occurs depending on the operating temperature selected. In the present invention, it is not critical whether this hydrophilic solvent remains in the molybdenum compound product or is removed by the vaporization. However, the presence in the molybdenum compound product of the hydrophilic solvent which is non-miscible with the hydrocarbon oil is meaningless, and is undesirable from the viewpoint of handling for storage and transportation, so that it is practical to remove the hydrophilic solvent from the molybdenum compound product. The methods for removing the hydrophilic solvent include, for example, an evaporation separation method and a liquid-liquid separation method utilizing specific gravity differences. When an oleophilic molybdenum compound is prepared in the form of a solution in a hydrocarbon oil by the use of a specific secondary or tertially amine, the hydrocarbon oil layer is either an upper layer or a lower layer, depending upon the types of the hydrocarbon oil and the hydrophilic solvent and the concentration of the oleophilic molybdenum compound. The removal of the hydrophilic solvent can be easily performed by liquid-liquid separation utilizing specific gravity differences.

The thus produced oleophilic molybdenum compound in the form of a highly dispersed suspension or a solution in a hydrocarbon oil, which molybdenum compound may be comprised of a plurality of species represented by different formulae, is optionally subjected to concentration adjustment, and used in hydroconversion. The solution of the oleophilic molybdenum compound exhibits the behavior of a Newtonian liquid. On the other hand, the suspension of the oleophilic molybdenum compound exhibits the behavior of a Non-Newtonian liquid, that is, the apparent viscosity of the suspension decreases with an increase in shearing rate.

The hydrocarbon oil may be removed from the oleophilic molybdenum compound to obtain it in an isolated form, the handling of which is, however, generally difficult.

The oleophilic molybdenum compound which is soluble in a hydrocarbon oil, exhibits the viscous gum-like morphology as exhibited by the conventional oil soluble metal soap. X-ray diffraction spectra of the oleophilic molybdenum compound show no distinct diffraction pattern, as different from hydrophilic heteropolyacids or inorganic salts thereof. With respect to the oleophilic molybdenum compound which is suspended in a hydrocarbon oil, observations by means of a scanning electron microscope show that it has a scaly solid morphology having a thickness of less than one micron (it is likely that the thickness is decreased with an increase in the number of carbon atoms contained in the hydrocarbon residue of the aliphatic amino cation constituting, with the heteropolyanion, the oleophilic molybdenum compound).

The oleophilic molybdenum compound of the present invention is added as an additive for hydroconversion. The oleophilic molybdenum compound is a catalyst precursor and it is converted in the hydroconversion reaction system to a catalyst, presumably a highly dispersed molybdenum sulfide-like compound by the reaction with sulfur compounds contained in a feedstock hydrocarbon oil, a sulfur compound added as an additive component according to necessity and hydrogen sulfide gas generated therefrom in a pre-hydroconversion pre-heating region or a hydroconversion reaction region, which molybdenum sulfide-like compound exhibits catalytic activities as mentioned hereinbefore.

A great many of heteropolyacids containing tungsten atoms as polyatoms are known. By using these heteropolyacids, an oleophilic tungsten compound can be obtained according to the method similar to that of the present invention. However, when this oleophilic tungsten compound is used as an additive for hydroconversion, its catalytic activities are extremely poor due presumably to the unsatisfactory conversion of the compound to a tungsten sulfide-like compound in a hydroconversion reaction region. The oleophilic tungsten compound is not useful for hydroconversion. However, the novel oleophilic tungsten compound would be useful, as the oleophilic molybdenum compound of the present invention would be, in other fields of applications in which the oleophilicity of the compound and the oxidizing properties of the heteropolyacid can be taken advantage of. For example, it would be useful as a phase transfer type oxidation catalyst.

In an infrared absorption spectrophotometry of the oleophilic molybdenum compound of the present invention, the heteropolymolybdate anion exhibits the same characteristic absorption peaks as known in the art. The characteristic absorption peaks of heteropolymolybdate anions are indicated in articles, such as Spectrochimica Acta, Vol. 32A, p.587 (1976); Inorganic Chemistry, Vol. 7, No. 3, p.437 (1968); ibid, Vol. 17, No. 5, p.1115 (1978); ibid, Vol. 22, No. 2, p.207 (1983); and J. Chem. Research (s) p.46 (1977). These articles indicate three characteristic stretching vibrations of a molybdenum-oxgen bond, i.e., $\nu_{as}$(Mo-O$_d$), $\nu_{as}$(Mo-O$_b$-Mo), and $\nu_{as}$(Mo-O$_c$-Mo), and one characteristic stretching vibration of a heteroatom-oxygen bond, i.e., $\nu_{as}$(X-O$_a$). In the above formulae, O$_a$ represents an oxygen atom bonded to a heteroatom (X), O$_b$ represents an oxygen atom forming a crosslinkage between two different Mo$_3$O$_{13}$ units, O$_c$ represents an oxygen atom forming a crosslinkage within one Mo$_3$O$_{13}$ unit, and O$_d$ represents an oxygen atom bonded to only one Mo atom. The typical values of these absorption peaks ascribed to the above stretching vibrations are shown in the following table below.

|   | | Keggin structure [XMo$_{12}$O$_{40}$]$^{n-}$ | lacunary Keggin structure [XMo$_{11}$O$_{39}$]$^{n-}$ | mixed Keggin structure [PMo$_9$V$_3$O$_{40}$]$^{6-}$ | Dawson structure [P$_2$Mo$_{18}$O$_{62}$]$^{6-}$ |
|---|---|---|---|---|---|
| 1 | $\nu_{as}$(Mo—O$_d$), cm$^{-1}$ | 975–939 | 930, 910–900 | 960 | 967, 933–928 |
| 2 | $\nu_{as}$(Mo—O$_b$—Mo), cm$^{-1}$ | 895–846 | 860–830 | 875 | 878–844 |
| 3 | $\nu_{as}$(Mo—O$_c$—Mo), cm$^{-1}$ | 805–760 | 790, 742–740 | 830–710 | 806–800 |
| 4 | $\nu_{as}$(X—O$_a$), cm$^{-1}$ | | | | |
|   | X = P | 1070–1056 | 1060, 1010 | 1100 | 1095 |
|   | X = Si | 910–895 | 870 | | |
|   | X = As | 906–895 | | | |
|   | X = Ge | 812–790 | | | |

In the table, the absorption peak values are indicated in ranges. This is because differences are observed from one reference article (mentioned above) to another, from one measuring method to another, from one heteropolyanion species to another, from one cation species to another, and from one crystal water content to another.

With respect to the oleophilic molybdenum compound of the present invention, the above characteristic absorption peaks are observed. In particular, with respect to an oleophilic molybdenum compound obtained by the stoichiomentric reaction of a heteropolyacid having a single structure or the metal salt thereof with an aliphatic amine, the above-mentioned four characteristic absorption peaks are clearly observed. However, with respect to an oleophilic molybdenum compound obtained using an aliphatic amine in an amount significantly in excess of the stoichiometry, it is likey that the four characteristic absorption peaks cannot clearly be distinguished. This is due to the presence of highly reduced reaction products, reaction products having a lower polycondensation ratio and molybdic acid compounds devoid of heteroatoms and due to the residue of the aliphatic amine. Particularly, the absorption peak of $\nu_{as}$ (Mo-$O_b$-Mo) becomes weak, so that it is likely that the peak is shadowed by the absorption peak of $\nu_{as}$ (Mo-$O_c$-Mo).

The oleophilic molybdenum compound of the present invention exhibits an absorption peak ascribed to a stretching vibration between a molybdenum atom and an oxygen atom within each of the ranges of 975–900 $cm^{-1}$, 895–830 $cm^{-1}$ and 830–710 $cm^{-1}$ in an infrared absorption spectrum. The absorption peak appearing within each of these ranges is not necessarily a single band, and may be split into two bands. Further, in addition to the stretching vibrations between a molybdenum atom and an oxygen atom, the stretching vibration between a heteroatom (X), contained in each compound, and an oxygen atom can be recognized as forming a characteristic absorption peak.

With respect to the oleophilic molybdenum compound of the present invention which is soluble in a hydrocarbon oil, an ultraviolet-visible light absorption spectrum shows the absorption peaks known in the art as being characteristic of a heteropolymolybdate anion. Two characteristic absorption peaks are known. One is a peak ascribed to a yellow color of the heteropolyanion and occurring within the range of 300–400 nm ($\lambda_{max}$) and the other is a peak ascribed to a blue color (generally known as molybdenum blue) of the reduced heteropolyanion and occurring within the range of 650–900 nm ($\lambda_{max}$). These absorption peaks are well known in the field of analytical chemistry because they can be used in a quantitative analysis of heteroatoms. For example, reference is made to "Bunseki Kagaku Binran" (manual for analytical chemistry), revised 3rd edition, 1981, edited by Chemical Society of Japan. Incidentally isopolyanions, such as paramolybdate anions have no absorption peak within the range of from 300 to 900 nm.

The oleophilic molybdenum compound of the present invention is characterized in that it has in an ultraviolet-visible light absorption spectrum at least one absorption peak selected from a peak occurring within the range of from 300 to 400 nm ($\lambda_{max}$) and a peak occurring within the range of from 650 to 900 nm ($\lambda_{max}$), both ascribed to a heteropolymolybdate anion structure.

With respect to a molybdenum compound which has a phosphorus atom as a heteroatom of the heteropolymolybdate anion and which is soluble in a hydrocarbon oil, a $^{31}$P-NMR spectrum can be obtained. The $^{31}$P-NMR spectrum data of a phosphorus polymolybdic acid in an aqueous solution thereof, which acid is used as a starting material in the method for producing the molybdenum compound according to the present invention, have been published in the art. For example, reference is made to Journal of Chemical Society of Japan, page 514 (1986); ibid. page 641 (1986). In these references, it is described that the $^{31}$P signal ascribed to phosphorus polymolybdic acid occurs in a magnetic field higher than that of the $^{31}$P signal of phosphoric acid, which is a simple acid. The $^{31}$P signal of the oleophilic phosphorus polymolybdenum compound of the present invention also occurs in a magnetic field higher than that of a phosphoric acid compound produced by using an aliphatic amine. This relationship is similar to the above-mentioned relationship observed between phosphorus polymolybdic acid and phosphoric acid. The $^{31}$p signal chemical shift valuew measured in a 5–10% by weight toluene solution using an 85% by weight aqueous phosphoric acid solution as an external standard of the oleophilic molybdenum compound obtained by reacting a representative single structure phosphorus polymolybdic acid with a stoichiometroic amount of an aliphatic amine, are shown below.

| Heteropolymolybdate anion group | Chemical shift (ppm) |
|---|---|
| Keggin structure $[PMo_{12}O_{40}]^{3-}$ | −1.5 to −2.5 |
| 2-electron reduced Keggin structure $[PMo_{12}O_{40}]^{5-}$ | −5.5 to −6.0 |
| 4-electron reduced Keggin structure $[PMo_{12}O_{40}]^{7-}$ | −4.5 to −5.5 |
| Dawson structure $[P_2Mo_{18}O_{62}]^{6-}$ | −1.5 to −2.5 |
| 2-electron reduced Dawson structure $[P_2Mo_{18}O_{62}]^{8-}$ | −3.5 to −4.0 |
| 4-electron reduced Dawson structure $[P_2Mo_{18}O_{62}]^{10-}$ | −7.0 to −8.0 |
| Phosphate as reference $PO_4^{3-}$ | +4.0 to +2.5 |

When the phosphorus polymolybdic acid as a starting material is comprised of non-reduced and reduced species, the produced oleophilic molybdenum compound is comprised of a plurality of species corresponding to the non-reduced and reduced species. The chemical shift of $^{31}$P signal is observed at an intermediate position because of an exchange reaction.

When a single structure phosphorus polymolybdic acid is employed as a starting material as well, a plurality of compound species are present in the oleophilic molybdenum compound as obtained by the use of an aliphatic amine in an amount excess of the stoichiometry, and hence a plurality of signals are observed due to the occurrence of signals attributed to the above-mentioned exchange reaction and signals attributed to different compound species, including those presumably originating in the lacunary Keggin structure or the lacunary Dawson structure. In the case where a specific aliphatic amine is used in large excess so as to completely decompose the heteropolyanion structure, the signals of the resultant oleophilic molybdenum compound are only observed within the range of from +4.0 to +2.5 ppm ascribed to a phosphate anion in a $^{31}$P-NMR spectrum.

The oleophilic molybdenum compound having a phosphorus polymolybdate anion exhibits one or a plurality of signals within the chemical shift range of +1.0 to −8.0 ppm in a phosphorus ($^{31}$P) nuclear magnetic resonance spectrum taken using an 85% by weight aqueous phosphoric acid solution as an external standard with respect to a toluene solution of the compound.

The aliphatic amino cation group as a moiety of the oleophilic molybdenum compound of the present invention is characterized by the signals observed in a proton nuclear magnetic resonance ($^1$H-NMR) spectrum. That is, the chemical shift value ($\delta$ ppm) of the proton signal ascribed to the methylene group bonded directly to the nitrogen atom of the aliphatic amino cation group is characteristically within the range of from 3.2 to 3.8 ppm. On the other hand, the chemical shift value ($\delta$ ppm) of the proton signal ascribed to the methylene group of the corresponding aliphatic amine as a starting material is generally within the range of from 2.2 to 2.7 ppm, and that ascribed to the methylene group of the inorganic salt thereof is generally within the range of from 2.8 to 3.2 ppm. These chemical shift data are indicated in references such as "The Sadtler Handbook of Proton NMR Spectra" (Sadtler Sanyo). The chemical shift value (δ ppm) ascribed to the methylene proton of an aliphatic amine salt of paramolybdic acid, which is an isopolyacid, is generally within the same range of from 2.8 to 3.2 ppm as that observed with respect to the inorganic salt of the aliphatic amine as a starting material. From the above, it is apparent that generally, the chemical shift value (δ ppm, 3.2–3.8 ppm) of the proton signal ascribed to the methylene group of the oleophilic molybdenum compound of the present invention is greater than that (δ ppm, 2.2–3.2 ppm) ascribed to the methylene groups of the corresponding aliphatic amine and inorganic salt thereof as starting materials and the aliphatic amine salt of paramolybdic acid. Therefore, it is presumed that there is a relatively strong interaction between the aliphatic amino cation group and the heteropolymolybdate anion group in the oleophilic molybdenum compound of the present invention.

The chemical shift value (δ ppm) of the proton signal ascribed to the methylene group of the oleophilic molybdenum compound slightly varies, depending on the type of the aliphatic amino cation group and the type of the heteropolymolybdate anion group. In general, the greater the ratio of the equivalent quantitiy of the aliphatic amino cation group to that of the heteropolymolybdate anion group, the lower the chemical shift (δ ppm) of the oleophilic molybdenum compound. Therefore, when the oleophilic molybdenum compound contains species devoid of heteroatoms (isopolymolybdic acid) as a result of the reaction in which a primary or secondary amine has been employed in an amount significantly in excess of stoichiometry, or when the oleophilic molybdenum compound contains unreacted amine or inorganic salt thereof as a result of the reaction in which a tertiary amine or an inorganic salt thereof has been employed in an amount significantly in excess of stoichiometry, the chemical shift value (δ ppm) as measured at room temperature of the proton signal ascribed to the methylene group of the oleophilic molybdenum compound is likely to be lower than the above-mentioned range of from 3.2 to 3.8 ppm. This is presumably because exchange reactions occur between the oleophilic molybdenum compounds having a heteropolymolybdate anion on the one hand and the isopolymolybdic acid compound, unreacted amine and unreacted salt thereof on the other hand. In these cases, if the measurement is conducted at low temperatures, for example, −60° C. or below, in order to inhibit such exchange reactions, the proton signal (3.2–3.8 ppm in terms of δ ppm) ascribed to the methylene group of the oleophilic molybdenum compound can be measured separately from the proton signal ascribed to the methylene group of the other compounds.

By the use of the oleophilic molybdenum compound of the present invention, hydroconversion of a hydrocarbon is effectively performed. In the case where the coking phenomenon, by which a portion of by-produced polycondensates, such as coke and asphaltene, deposit onto or adhere to the interior of the hydroconversion apparatus, is extreme depending on the type and the boiling point fraction range of the feedstock and the hydroconversion conditions to thereby cause a stable operation of the hydroconversion to be difficult, it is preferred that fine powder, such as fine ceramic powder and carbon black powder, be added as an additive in order to suppress the coking phenomenon (see U.S. Pat. No. 4,770,764).

In hydroconversion of a hydrocarbon using the molybdenum compound of the present invention, the type of the hydrocarbon is not critical. That is, any one selected from crude oil, tar sand extract oil, shale oil and liquified coal oil can be used, and further, any one selected from atmospheric distillation residual oil, vacuum distillation gas oil and vacuum distillation residual oil, which are all distillation fractions of the above-mentioned oils can also be used.

When the oleophilic molybdenum compound of the present invention is dispersed in a heavy hydrocarbon oil, such as vacuum distillation residual oil, hydroconversion of the heavy hydrocarbon oil is effectively attained by virtue of the molybdenum compound, although hydroconvertion of the heavy hydrocarbon oil is generally difficult if conventional methods are employed. Further, when the oleophilic molybdenum compound of the present invention is applied to liquefaction of coal, it is generally added to a slurry of a mixture of particulate coal and oil.

The amount of the molybdenum compound to be added to the feedstock oil is varied, depending on the type of the molybdenum compound, the properties of the feedstock hydrocarbon, the degree of intended hydroconversion (that is, the degree of lightness of product oil and the degree of modification of the properties of the hydrocarbon), and the type of the hydroconversion reactor apparatus. For example, when the employed feedstock hydrocarbon is a vacuum distillation residual oil with which the amount of polycondensates, such as coke and asphaltene, by-produced in hydroconversion is large and when the major purpose of the addition of the molybdenum compound is to suppress the generation of such polycondensates, the oleophilic molybdenum compound is generally dispersed in the feedstock in an amount of from 10 to 500 ppm by weight, and preferably from 10 to 200 ppm by weight, in terms of the amount molybdenum per se. Naturally, there is no problem in increasing the above-mentioned amount in order to promote the desired hydrogenation and removal of heteroatoms for hydroconversion product oils, thereby attaining further modification of the properties of the product oils.

After the addition of the oleophilic molybdenum compound to a feedstock heavy hydrocarbon oil, the oil is mixed with a hydrogen gas or a hydrogen gas-containing gas, and the resultant mixture is heated under a pressure to conduct a hydroconversion of the heavy hydrocarbon oil. For attaining a high through-put of hydroconversion using a compact reactor apparatus, it is preferred that the hydroconversion be conducted at a high temperature for a short residence time. Generally, the hydroconversion is conducted at about 450° C. to 500° C. The hydroconversion is conducted for a residence time of from 10 minutes to 5 hours, which is varied depending on the amount of charged feedstock. The hydrogen gas or hydrogen gas-containing gas is introduced into a mixture of the molybdenum compound and the heavy hydrocarbon oil at a hydrogen partial pressure of about 100 to 250 kg/cm$^2$. With respect to the amount of hydrogen gas or hydrogen gas-containing gas to be introduced, it is preferred that a sufficient amount be introduced to achieve an effective mixing of gas and liquid in accordance with the reactor apparatus to be used. The hydrogen gas or hydrogen gas-containing gas is generally introduced into the mixture of the molybdenum compound and the heavy hydrocarbon oil so that the amount of hydrogen becomes about 200 to 2000 Nm$^3$ per kl of the mixture. Generally, the hydrogen gas or hydrogen gas-containing gas is circulated within the reactor apparatus, in which the hydrogen gas is consumed by the hydroconversion and by dissolving into oil, in an amount such that hydrogen is supplied for the hydrogen partial pressure to be kept constant despite such consumption.

In this connection, it is to be noted that the above-mentioned reaction conditions for the hydroconversion are not critical. Each reaction parameter takes each favorable value not independently from each other but in a mutual relationship among these reaction parameters. Therefore, the favorable range of each reaction parameter is varied with the combination of parameters.

The hydroconversion may be conducted using any conventional reactor apparatus as long as the apparatus is suitable for conducting a suspension catalytic reaction. Representative examples of reactor apparatuses include a tubular reactor, a tower reactor and a drum reactor. Generally, these reactors are each comprised of a preheating zone and a reaction zone. Hydroconversion reaction systems for use in the present invention include a one-through reaction system in which the total amount of the residue is taken out of the reactor apparatus, and a recycle reaction system in which at least portion of the residue is introduced into the reaction zone, thereby recycling the residue.

Now, one mode of the method for the hydroconversion using the oleophilic molybdenum compound of the present invention, in which the hydroconversion is conducted in a continuous manner, will be explained in detail referring to FIG. 1.

As shown in FIG. 1, the hydroconversion system is comprised of mixing zone 3 in which the oleophilic molybdenum compound and the feedstock heavy hydrocarbon are mixed together; reaction zone 6 in which the hydroconversion is conducted; separating zone 8 in which the reaction product is separated into a gas phase and a liquid phase; and distillation zone 12 in which the liquid phase separated from the gas phase in separating zone 8 is separated into fractions having different boiling points by distillation.

First, the oleophilic molybdenum compound of the present invention and the feedstock hydrocarbon are introduced into mixing zone 3 through lines 1 and 2, respectively, and well mixed together. The resultant mixture is pressurized by means of a pump, and mixed in line 4 with a hydrogen gas or hydrogen gas-containing gas introduced through line 5, which gas has been pressurized by means of a compressor. Then, the mixture is introduced into reaction zone 6. Reaction zone 6 is usually comprised of a preheating zone and a hydroconversion zone. For the purpose of commercial hydroconversion, the hydroconversion zone is preferably comprised of a tubular reactor in which the flow rate is high and in which a flow pattern, such as bubble flow, advantageous from the viewpoint of satisfactory mixing of a gas, a liquid and a solid, is effectively created. The reaction mixture is taken out of the reaction zone 6 through line 7 and introduced into the separating zone 8. In the separating zone 8, the mixture is separated into a gas phase and a liquid phase. The gas phase separated from the liquid phase is taken out of the separating zone 8 through line 9. If desired, from the thus taken out gas phase, a light oil and undesirable gas components are removed to obtain a hydrogen-containing gas, which is introduced into line 5 through line 10 for recycling. On the other hand, the liquid phase separated from the gas phase is taken out through line 11, and the pressure of the liquid phase is reduced to atmospheric pressure. The liquid phase is then introduced into distillation zone 12. The distillation zone is generally comprised of an atmospheric distiller and a vacuum distillator which are arranged linearly. In the distillation zone 12, the liquid phase is separated into fractions, for example, light oil distillates (such as naphtha and kerosen), middle oil distillates (such as gas oil and vacuum gas oil), and residue (containing heavy distillates and solids, such as catalyst and polycondensates), utilizing the differences in boiling point between the fractions.

The separated light oil distillates and middle oil distillates are taken out through lines 13 and 14 respectively. The thus taken out distillates as such may be used as intermediate products for petroleum products, or feedstocks for petroleum chemicals. If desired, the taken out distillates may be refined by a customary petroleum refining process before use as intermediates or feedstocks mentioned above. On the other hand, the residue is taken out through line 15. The thus taken out residue as such may be used as a fuel oil for a customary boiler. The method in which the total amount of the residue is taken out of the reaction apparatus is generally known as a one-through reaction system. When a recycle reaction system is employed instead of the one-through reaction system, at least a portion of the residue is introduced into reaction zone 3 through line 16, thereby recycling the residue.

According to the present invention, an advantageous oleophilic molybdenum compound is provided, which can be easily produced by reacting a hydrophilic heteropolyacid with a specific aliphatic amine. The oleophilic molybdenum compound exhibits extremely high catalytic activities for hydroconversion when it is dispersed in a feedstock hydrocarbon and hydroconversion is conducted. Even if vacuum distillation residual oil, which is the heaviest of all distillates of crude oil, is used as a feedstock hydrocarbon, a hydroconversion thereof to more valuable light oils at a high conversion ratio, for example, 80% by weight or above, can be realized by the use of the oleophilic molybdenum compound of the present invention. The oleophilic molybdenum compound of the present invention, which is a precursor convertible to a catalyst exhibiting excellent catalytic activities in hydroconversion of a hydrocarbon and which is free from technical and practical problems as encountered in the conventional methods, is highly valuable in industry from the viewpoint of effective utilization of hydrocarbon resources.

PREFERRED EMBODIMENT OF THE INVENTION

The present invention will now be further illustrated in more detail with reference to the following Examples which should not be construed to be limiting the scope of the present invention.

The heteropolyacids and the salts thereof used in the following Examples and Comparative Examples are synthesized and purified by conventional methods. The identification of the heteropolyacids and the salts is conducted through the measurement of the amount of metals by emission spectroscopic analysis, through the structure analysis by X-ray diffractometry, nuclear magnetic resonance or infrared spectrophotometry, through the decomposition pattern analysis and the measurement of the amount of crystal water by thermal analysis, and through the measurement of oxidation reduction potential by polarography. On the other hand, the aliphatic amines and aliphatic ammonium compounds are those which are commercially available as a reagent or an industrial product.

Infrared absorption spectroscopy is conducted by means of Nicolet 60 SX FT-IR spectrophotometer manufactured by Nicolet Instrument, U.S.A. With respect to a molybdenum compound dissolved in an organic solvent, the concentration, in terms of the concentration of molybdenum per se (hereinafter referred to simply as an Mo concentration), of the solution is adjusted to 3% by weight, and the resultant solution is dropped onto a KBr plate, followed by air-drying to thereby obtain a specimen in the form of a thin film. The thus obtained specimen is measured by a transmission method. On the other hand, with respect to a molybdenum compound suspended in an organic solvent, the organic solvent is evaporated off to obtain a solid, and the solid is mixed with KBr powder so as to have an Mo concentration of 1% by weight, followed by pelletization to thereby obtain a specimen in the form of a pellet. The thus obtained specimen is measured by diffuse reflectance spectroscopy. Transmission is repeated 32 times when the transmission method is employed, and diffuse reflectance is repeated 100 times when the diffuse reflectance spectroscopy is employed. In both of the transmission method and the diffuse reflectance spectroscopy, the range of wave number is from 1200 cm$^{-1}$ to 600 cm$^{-1}$.

Ultraviolet absorption spectroscopy is conducted within the range of wavelength of from 200 to 800 nm by means of MPS-2000 spectrophotometer manufactured by Shimadzu Corporation, Japan. With respect to a molybdenum compound dissolved in toluene, it is diluted with toluene to prepare a solution having an Mo concentration of 60 ppm. The thus obtained solution is used as a specimen. On the other hand, with respect to a molybdenum compound dissolved in an organic solvent other than toluene, the organic solvent is evaporated off to obtain a solid, and the solid is dissolved in toluene so as to obtain a solution having an Mo concentration of 60 ppm. The thus obtained solution is used as a specimen.

$^{31}$P nuclear magnetic resonance spectroscopy is conducted by means of JEOL FX 200 polynuclear magnetic resonance spectrometer manufactured by JEOL LTD., Japan. With respect to a molybdenum compound dissolved in toluene, it is diluted with toluene to prepare a solution having an Mo concentration of 5% by weight. The thus obtained solution is used as a specimen. On the other hand, with respect to a molybdenum compound dissolved in an organic solvent other than toluene, the organic solvent is evaporated off to obtain a solid, and the solid is dissolved in toluene so as to have an Mo concentration of 5% by weight. The thus obtained solution is used as a specimen. The thus obtained specimen is charged into a sample tube with an outer diameter of 10 mm, followed by disposing a glass capillary in which an 85% by weight aqueous solution of phosphoric acid as an external standard is sealed in the center of the sample tube. Then, 1000 scans are conducted to obtain a spectrum.

$^1$H nuclear magnetic resonance spectroscopy is conducted by means of JEOL JNM-PMX60 proton nuclear magnetic resonance spectrometer manufactured by JEOL LTD., Japan. The organic solvent is evaporated off from a molybdenum compound dissolved therein, and the thus obtained solid is dissolved in CDCl$_3$ to obtain a solution having an Mo concentration of 10% by weight. The resultant solution is used as a specimen. Then, measurement is conducted using TMS (tetramethylsilane) as an internal standard.

EXAMPLE 1

30 g of H$_3$[PMo$_{12}$O$_{40}$].29H$_2$O as a heteropolyacid is dissolved in 120 g of deionized water to thereby prepare a 20% by weight aqueous solution of the heteropolyacid. Separately, 200 g of toluene as a hydrocarbon oil is heated to 80° C., and 10 g of stearylamine (C$_{18}$H$_{37}$NH$_2$) is added, thereby obtaining a dispersion. To the dispersion is added the total amount of the above-mentioned aqueous solution, and the resultant mixture is agitated for 15 minutes by means of a high speed stirrer [comprising a turbine (diameter: 28 mm) and a stator and being capable of giving a high shearing force to a fluid when the fluid passes through a clearance (0.4 mm) between the turbine and the stator] under such conditions that the revolution rate is 10,000 rpm, the peripheral speed is 16 m/s, and the turbine discharge rate is 33 liters/min. Thus, a molybdenum compound represented by the formula shown in Table 17 is obtained. In this Example, the molar ratio of the amine to the heteropolyacid is 3. The suspension has an Mo concentration of 4.1% by weight as found by diluting it with a heavy oil and, then, measuring a molybdenum concentration by the conventional fluorescent X-ray method. Further, when 0.5 g of the suspension is dispersed in a mixture of 50 g of hexane (upper phase) and 50 g of water (lower phase), all of the suspension is dispersed in the hexane phase and no trace of molybdenum is detected in the water phase. This indicates that the prepared molybdenum compound is oleophilic.

In an IR spectrum of the molybdenum compound of Example 1, four characteristic absorption peaks ascribed to a heteropolymolybdate anion are observed, which are 1055 cm$^{-1}$ (m)[$\nu_{as}$(X—O$_a$)], 959 cm$^{-1}$(s) [$\nu_{as}$(Mo—O$_d$)], 848 cm$^{-1}$ (m)[$\nu_{as}$(Mo—O$_b$—Mo)]and 784 cm$^{-1}$(s)[$\nu_{as}$((Mo—O$_c$—Mo)].

The wavenumbers for absorption peaks of an IR spectrum described in the following Examples indicate, as in Example 1, the wavenumbers ascribed to a stretching vibration of an Mo—O bond and to a stretching vibration of an X (a hetero atom)-0 bond, which are characteristic of a heteropolymolybdate anion.

EXAMPLES 2-6

Suspensions are separately obtained in substantially the same manner as in Example 1, except that a heteropolyacid solution and an amine shown in Table 1 are used. The measurement results of the Mo concentrations of the suspensions are also shown in Table 1.

In Example 2, a molybdenum compound represented by the formula shown in Table 17 is obtained, an IR spectrum of which has peaks at 1055(m) cm$^{-1}$, 959(s) cm$^{-1}$, 848(m) cm$^{-1}$ and 784(s) cm$^{-1}$.

In Example 3, a molybdenum compound comprised of species represented by the formulae shown in Table 17 is obtained, an IR spectrum of which has peaks at 947(m) cm$^{-1}$, 892(s) cm$^{-1}$ and 758(m) cm$^{-1}$.

In Example 4, a molybdenum compound represented by the formula shown in Table 17 is obtained, an IR spectrum of which has peaks at 960(m) cm$^{-1}$, 899(s) cm$^{-1}$, 866(w) cm$^{-1}$ and 785(s) cm$^{-1}$.

In Example 5, a molybdenum compound comprised of species represented by the formulae shown in Table 17 is obtained, an IR spectrum of which has peaks at 1055(m) cm$^{-1}$, 954(s) cm$^{-1}$ and 784(s) cm$^{-1}$.

In Example 6, a molybdenum compound comprised of species represented by the formulae shown in Table 17 is obtained, an IR spectrum of which has peaks at 1055(m) cm$^{-1}$, 954(s) cm$^{-1}$ and 784(s) cm$^{-1}$.

EXAMPLE 7

100 g of $H_8[CeMo_{12}O_{42}] \cdot 18H_2O$ as a heteropolyacid is dissolved in 100 g of deionized water to thereby prepare a 50% by weight aqueous heteropolyacid solution. Separately, 600 g of a hydrocarbon oil comprised of a residual oil [total content of fractions having a b.p. of 520° C. or above: 95.0% by weight, density: 1.044 g/cm$^3$ (15° C.), kinematic viscosity: 100 St (stokes) (100° C.), S content: 5.03% by weight, and N content: 0.30 % by weight] obtained by vacuum distillation of Khafji crude oil is heated and kept at 80° C. 190 g of triacontylamine ($C_{30}H_{61}NH_2$) as a primary amine is added to the residual oil to thereby obtain a dispersion. The total amount of the above-mentioned aqueous solution is added to the thus obtained dispersion, and the resultant mixture is agitated by means of the same high speed stirrer as employed in Example 1 for one hour under the same conditions as in Example 1. During the agitation operation, water is evaporated off by agitation heat and heating, and when the agitation operation is completed, the resultant suspension has a temperature of 150° C. As a result, a molybdenum compound represented by the formula shown in Table 17 is obtained. In this Example, the molar ratio of the amine to the heteropolyacid is 10. The suspension is diluted with a heavy oil, and subjected to a measurement of Mo concentration by the fluorescent X-ray method. The Mo concentration is found to be 5.7% by weight. Further, the suspension is subjected to a measurement of water content by the Karl-Fischer's method. The water content is found to be less than 0.1% by weight.

EXAMPLES 8-10

Suspensions are produced in substantially the same manner as described in Example 7, except that the aqueous heteropolyacid solutions and amines indicated in Table 2 are employed. The molar ratios of the amine to the heteropolyacid and the Mo concentrations are also shown in Table 2. In Examples 8 and 10, molybdenum compounds represented by the respective formulae shown in Table 17 are obtained. In Example 9, a molybdenum compound comprised of species represented by the formulae shown in Table 17 is obtained.

EXAMPLE 11

180 g of powdery molybdenum trioxide ($MoO_3$) and 18 g of a 75% by weight aqueous phosphoric acid solution are added to a solution comprised of 500 g of deionized water and 300 g of isopropyl alcohol. The resultant mixture is heated at 80° C. for 6 hours to thereby obtain a solution of heteropolymolybdic acid of the formula $H_3[PMo_{12}O_{40}]$. Subsequently, the isopropyl alcohol and water are evaporated off to thereby concentrate the molybdenum solution. The concentrated solution is subjected to filtration using filter paper JIS Type 5-C (non-pass particle size$\geq 2.5 \mu$) to remove a trace amount (about 0.5 g) of insoluble substances. The resultant filtrate is subjected to a measurement of Mo concentration by emission spectroscopic analysis. The Mo concentration is found to be 17.0% by weight. Separately, 200 g of toluene as a hydrocarbon oil is heated at 80° C., and 18 g of eicosylamine ($C_{20}H_{41}NH_2$) as a primary amine is added to the toluene to thereby obtain a dispersion. 100 g of the above-obtained filtrate is poured into this dispersion, and the mixture is agitated by means of the same high speed stirrer as employed in Example 1 under the same conditions as in Example 1. In this Example, the molar ratio of the amine to the heteropolyacid is 4. The resultant suspension is diluted with a heavy oil, and subjected to a measurement of Mo concentration by the fluorescent X-ray method. The Mo concentration is found to be 5.3% by weight. Further, the suspension is subjected to analysis by infrared absorption spectroscopy to obtain an infrared absorption spectrum. The spectrum exhibits characteristic peaks at wavenumbers 1055 (m), 951 (s), 860 (m) and 789 (s) cm$^{-1}$.

EXAMPLE 12

50 g of $H_3[PMo_{12}O_{40}] \cdot 29H_2O$ as a heteropolyacid is dissolved in 150 g of deionized water to thereby prepare a 25% by weight aqueous heteropolyacid solution. Separately, 300 g of toluene as a hydrocarbon oil is heated to 80° C., and 38 g of didecylamine [$(C_{10}H_{21})_2NH$] as a secondary amine is added, thereby obtaining a dispersion. To the dispersion is poured the total amount of the above-mentioned aqueous solution, and the resultant mixture is agitated at a revolution rate of 800 rpm for one hour by means of a constant-speed stirrer provided with three blades of 45 mm in diameter. During the agitation operation, this mixture is kept at a temperature of 80° C. while preventing the mixture from evaporating off by means of a condenser. As a result, a molybdenum compound comprised of species represented by the formulae shown in Table 17 is obtained. The molar ratio of the amine to the heteropolyacid employed in this Example is 6. After completion of the agitation operation, the resultant liquid mixture is allowed to stand for two hours to thereby separate the liquid into an upper phase of a toluene solution and a lower phase of an aqueous solution. The toluene solution in the upper phase is taken out to thereby obtain a molybdenum compound-containing solution. The thus obtained toluene solution is subjected to the fluorescent X-ray method to thereby find that the Mo concentration is 6.5% by weight. Emission spectroscopic analysis is conducted with respect to the aqueous solution in the lower phase for determination of the concentration of the molybdenum compound. The Mo concentration of the aqueous solution is found to be 60 ppm. From these results, it is confirmed that molybdenum has completely been migrated from the aqueous solution to the toluene solution. Analysis values obtained by each of IR, UV, $^1$H-NMR and $^{31}$P-NMR spectroscopies are as follows:

IR:1055(m) cm$^{-1}$, 954(s) cm$^{-1}$, 784(s) cm$^{-1}$.
UV:310(s) nm, 700(m)nm.
$^1$H-NMR:3.4 ppm.
$^{31}$P-NMR:+0.2(m) ppm, −1.2(s) ppm, −3.5(s) ppm.

Figure 2:
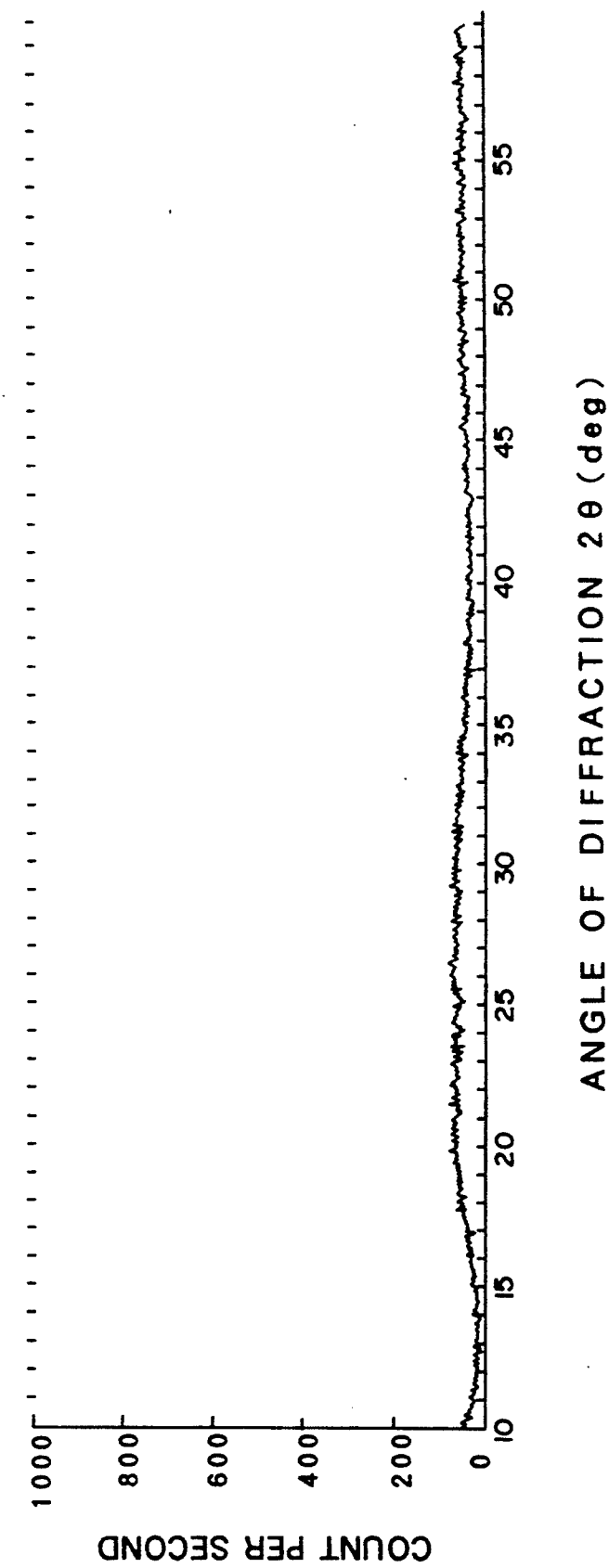
FIG. 2 shows an X-ray diffraction pattern of a molybdenum compound according to the present invention, obtained in Example 12.
Figure 3:
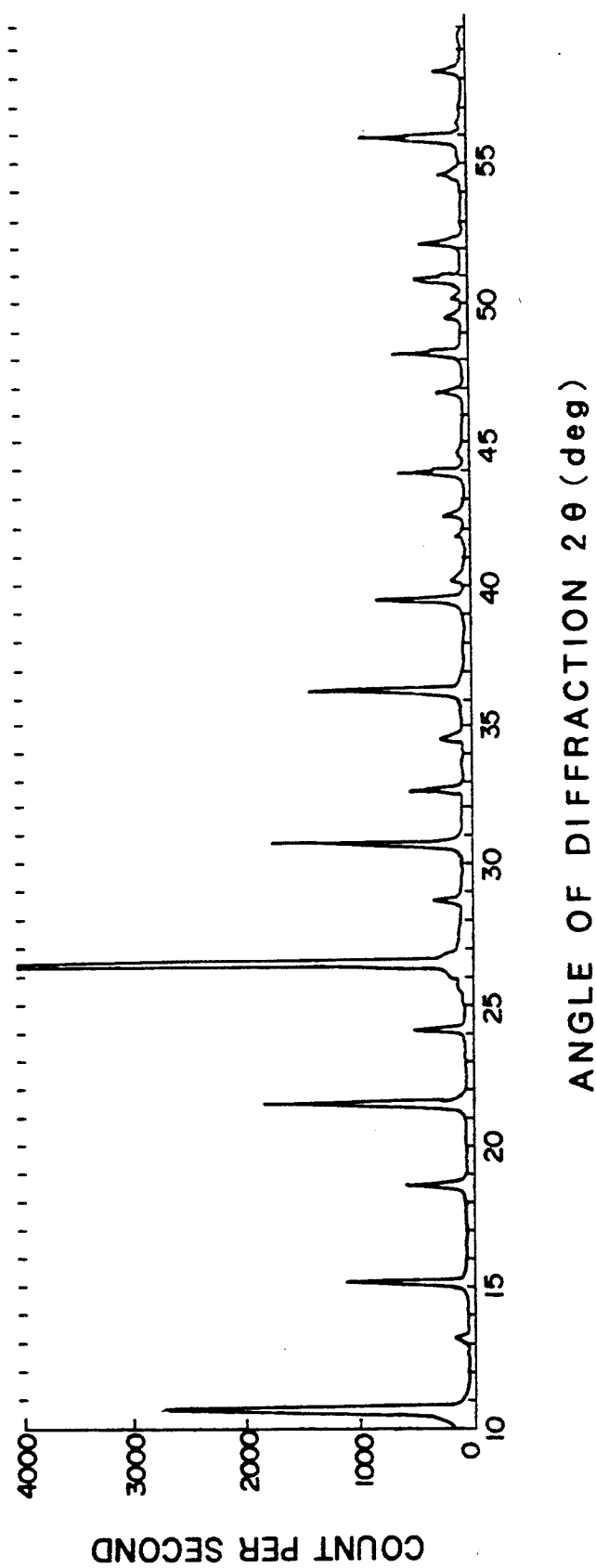
FIG. 3 shows an X-ray diffraction pattern of ammonium phosphomolybdate of the formula $(NH_4)_3[PMo_{12}O_{40}]$ as a comparative compound.
Figure 4:
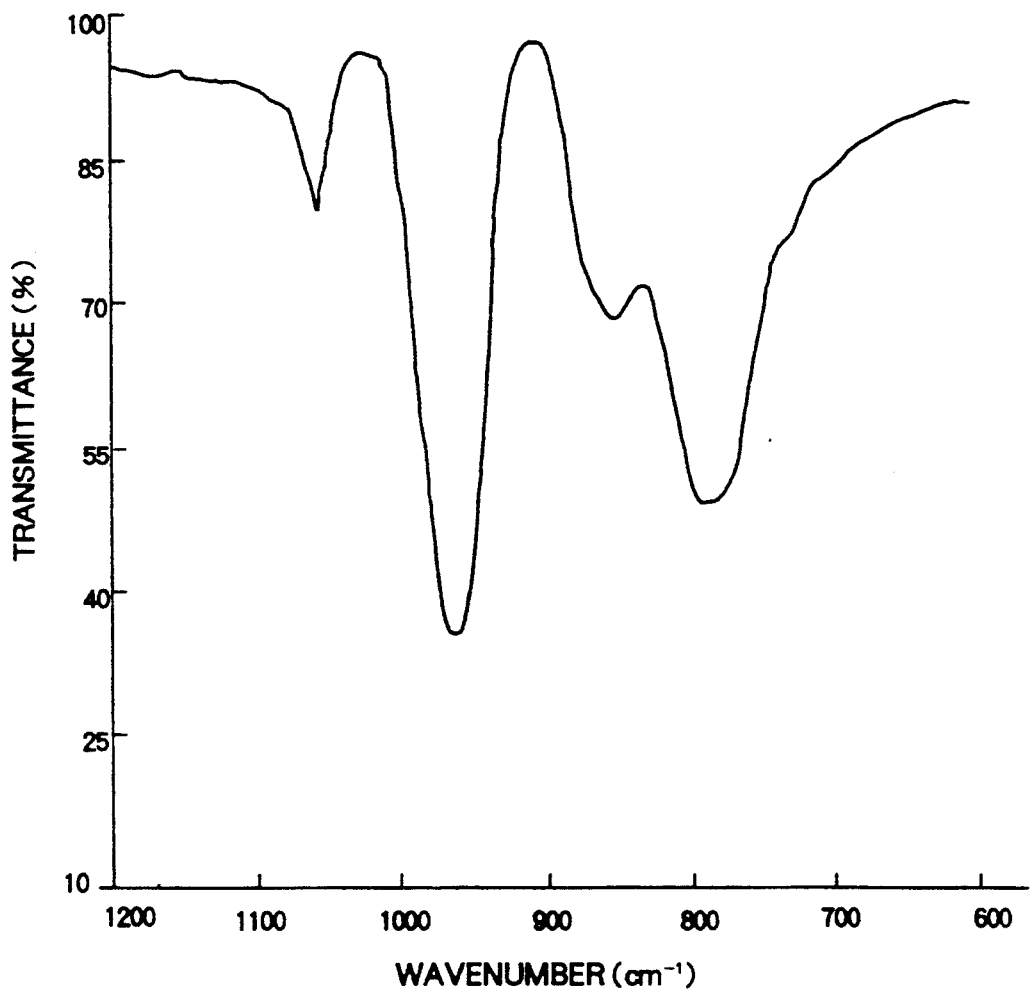
FIG. 4 shows an infrared absorption spectrum of a molybdenum compound according to the present invention, obtained in Example 15.
Figure 5:
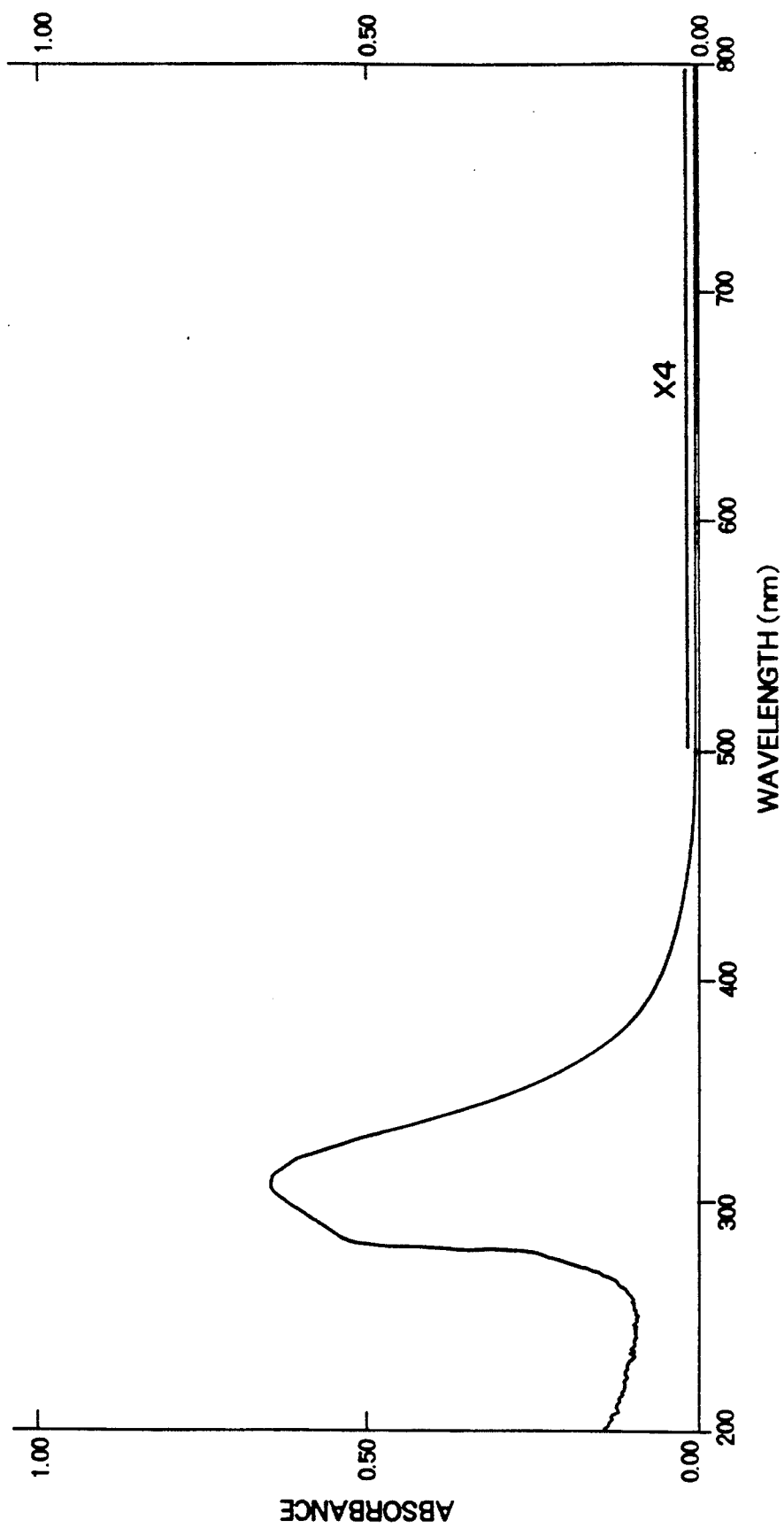
FIG. 5 shows an ultraviolet-visible light absorption spectrum of a molybdenum compound according to the present invention, obtained in Example 15.
Figure 6:
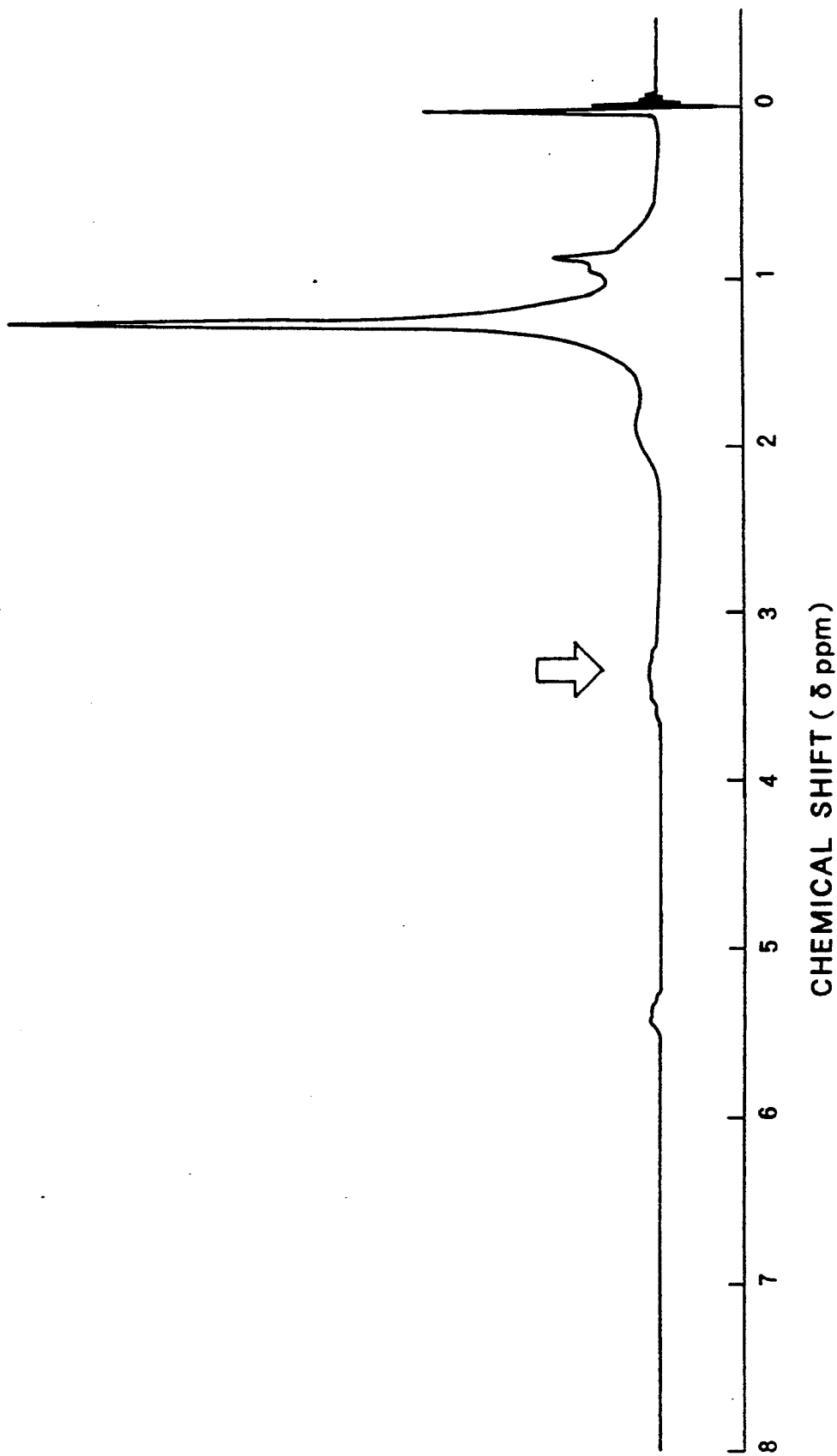
FIG. 6 shows a $^1$H-NMR spectrum of a molybdenum compound according to the present invention, obtained in Example 15.
Figure 7:
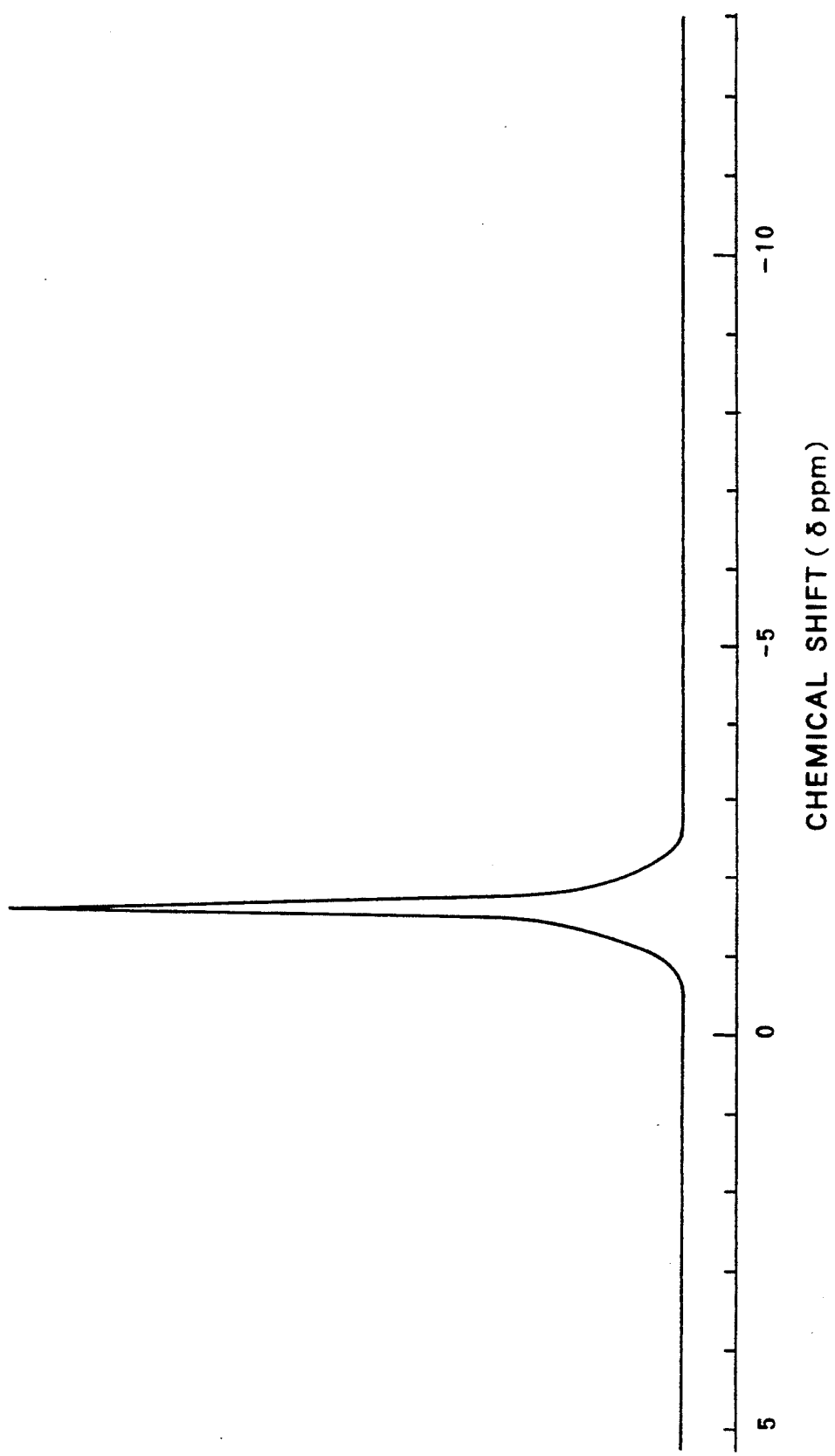
FIG. 7 shows a $^{31}$P-NMR spectrum of a molybdenum compound according to the present invention, obtained in Example 15.
Figure 8:
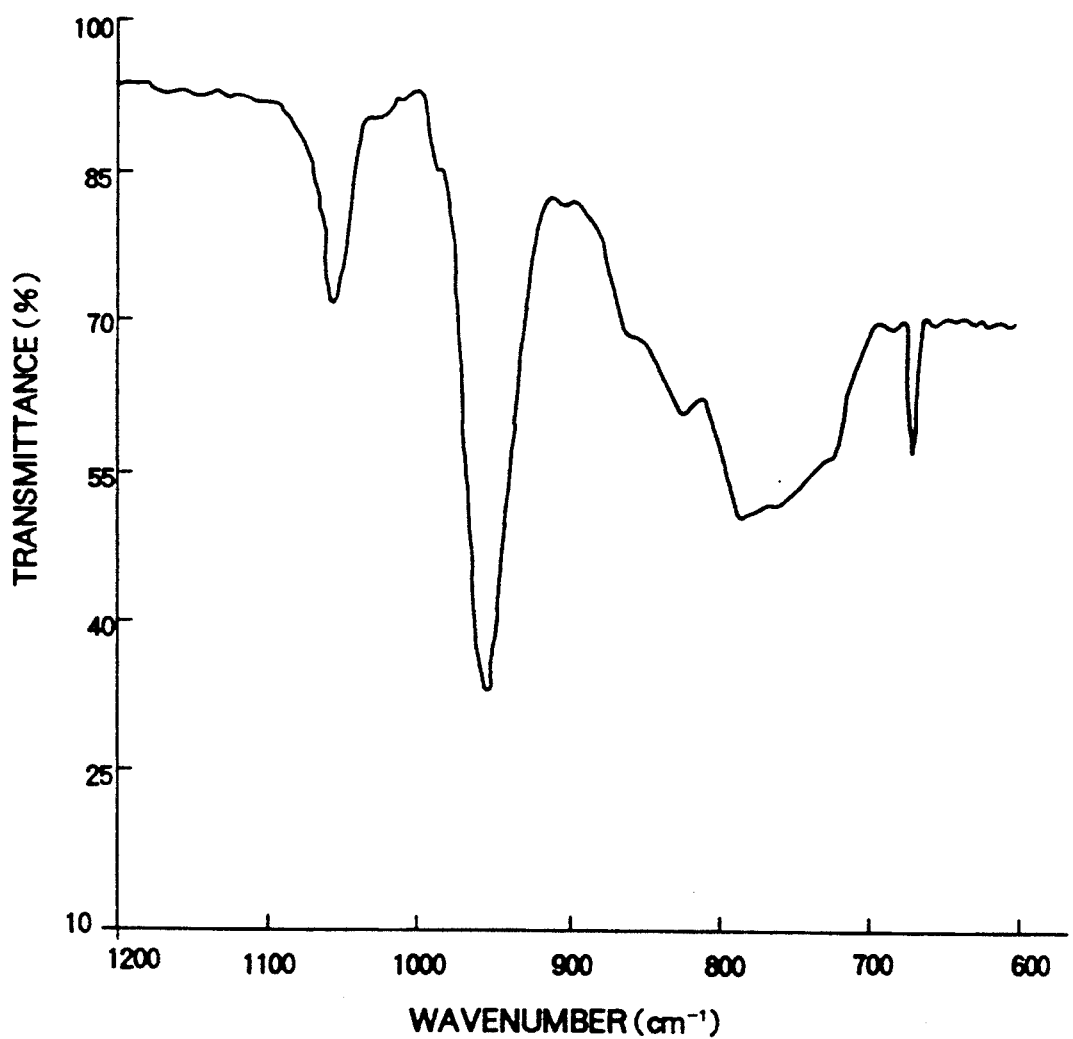
FIG. 8 shows an infrared absorption spectrum of a molybdenum compound according to the present invention, obtained in Example 17.
Figure 9:
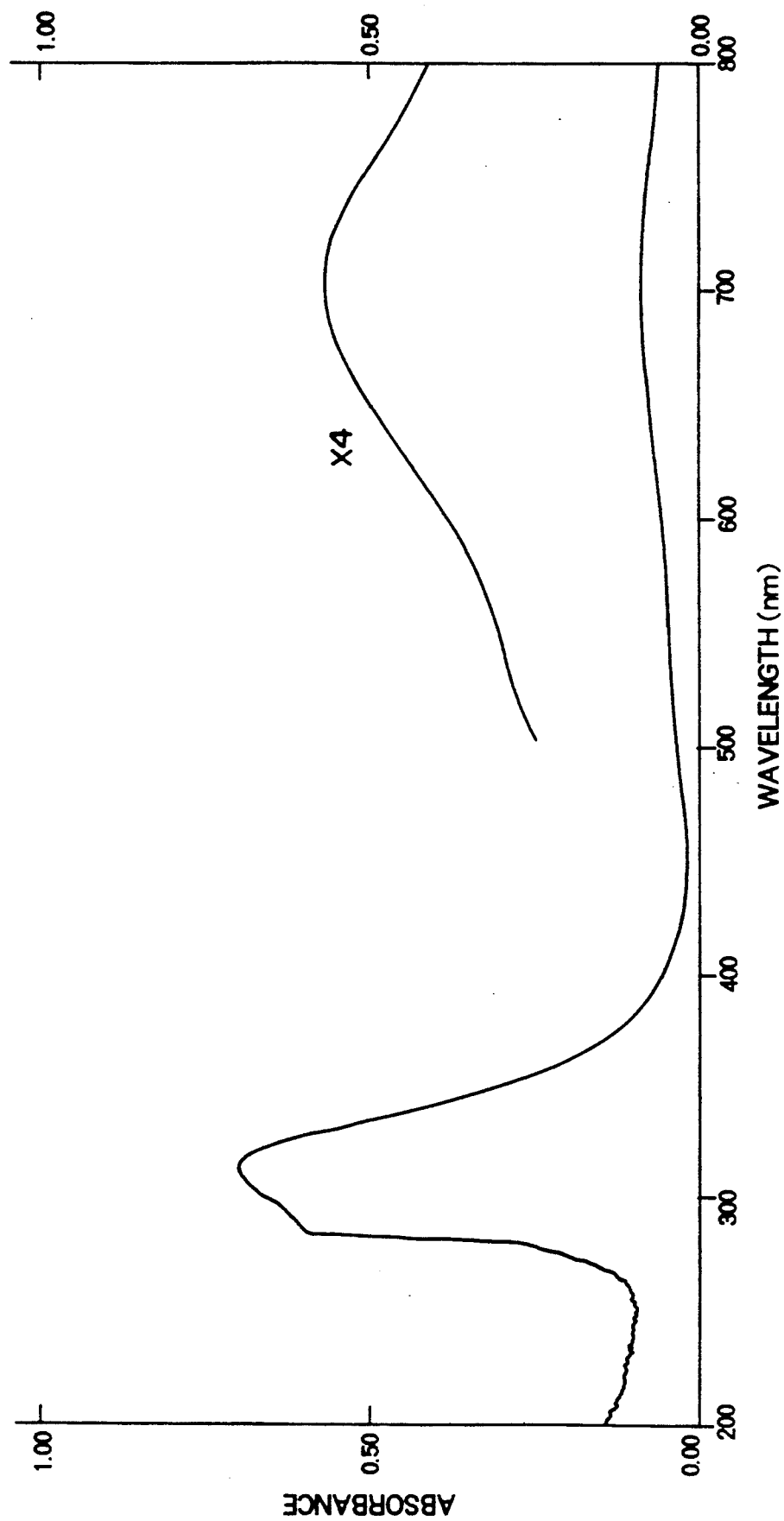
FIG. 9 shows an ultraviolet-visible light absorption spectrum of a molybdenum compound according to the present invention, obtained in Example 17.
Figure 10:
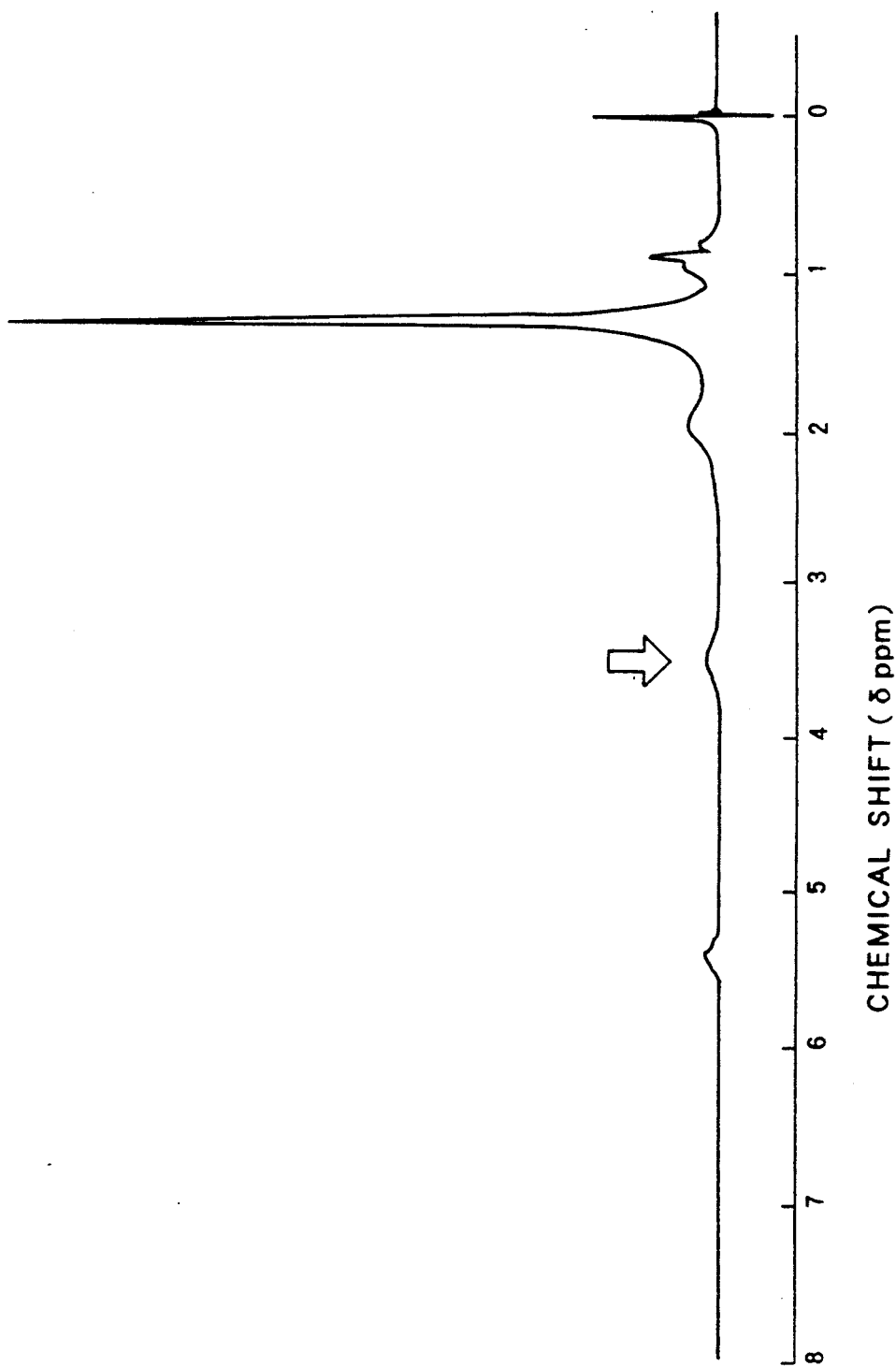
FIG. 10 shows a $^1$H-NMR spectrum of a molybdenum compound according to the present invention, obtained in Example 17.
Figure 11:
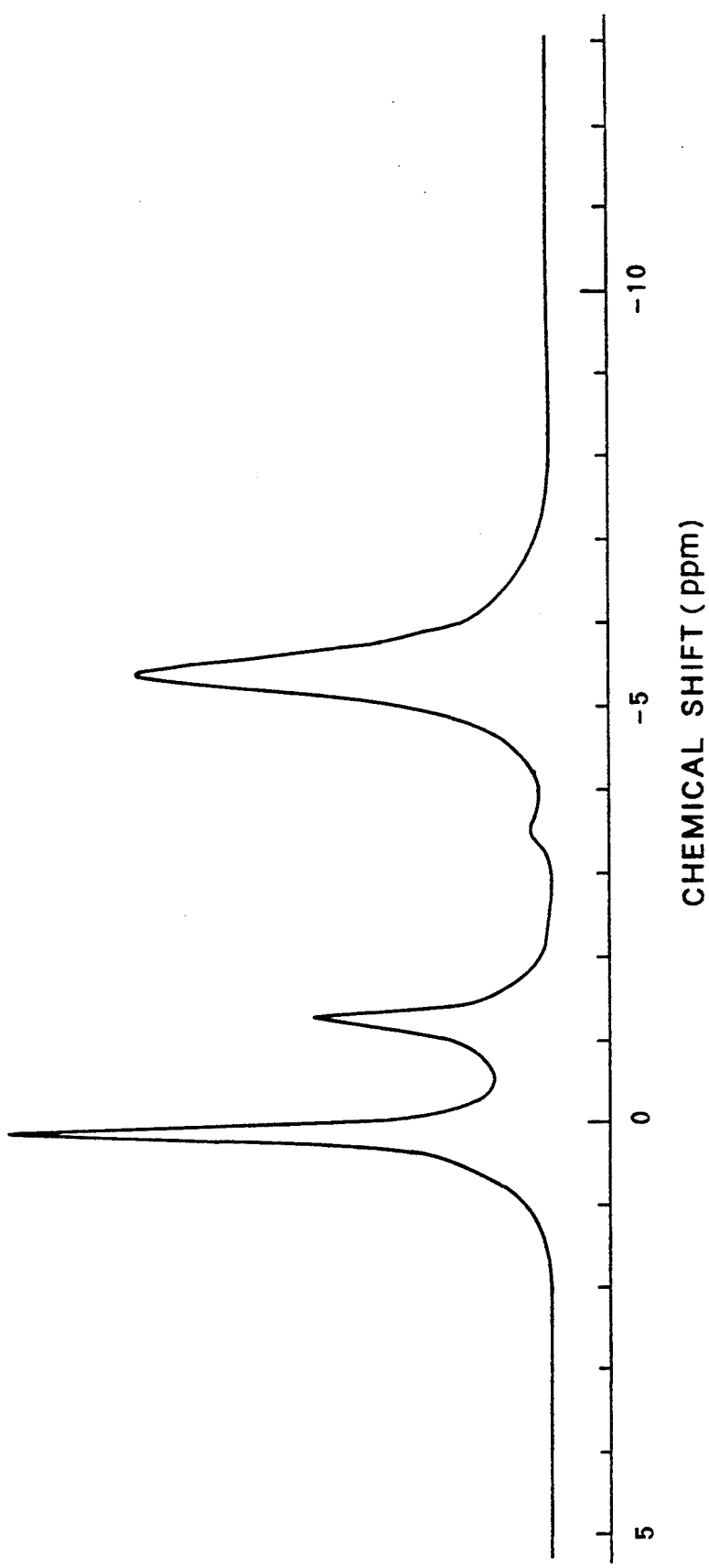
FIG. 11 shows a $^{31}$P-NMR spectrum of a molybdenum compound according to the present invention, obtained in Example 17.

With respect to $^1$H-NMR spectroscopy, only a chemical shift value in terms of δ ppm for the proton of the methylene group directly bonded to the nitrogen of an amine (N—CH$_2$—). This applies throughout the following Examples. Further, the solvent is removed from the toluene solution to isolate a molybdenum compound, and the molybdenum compound is subjected to X-ray diffractometry. The result is shown in FIG. 2. As is apparent from FIG. 2, a definite X-ray diffraction pattern cannot be observed. For comparison, an X-ray diffraction pattern of ammonium phosphomolybdate of the formula $(NH_4)_3[PMo_{12}O_{40}]$ is shown in FIG. 3.

EXAMPLES 13 TO 33

Molybdenum compound solutions dissolved in a hydrocarbon solvent are produced in substantially the same manner as described in Example 12, except that heteropolyacids, amines and hydrocarbon solvents indicated in Tables 3, 4 and 5 are employed. Reaction is conducted at 70° C. when cyclohexane is employed, and at 60° C. when hexane is employed.

In Examples other than Examples 15 and 19, the solution is separated into a hydrocarbon solution in an upper phase and an aqueous solution in a lower phase. By contrast, in Examples 15 and 19, the solution is separated into an aqueous solution in an upper phase and a hydrocarbon solution in a lower phase.

Mo concentrations determined in these Examples are also shown in Tables 3, 4 and 5. In each of Examples 13, 14, 16, 17, 19, 20, 22 to 25, 29 and 30, a molybdenum compound comprised of species represented by the formulae shown in Table 17 is obtained. In each of Examples 15, 18, 21, 26 to 28, and 31 to 33, a molybdenum compound represented by the formula shown in Table 7 is obtained.

In Examples 13 to 33, analysis values obtained by IR, UV, $^1$H-NMR and $^{31}$P-NMR spectroscopies are shown in Tables 6, 7 and 8.

In Example 15, an IR spectrum, a UV spectrum, a $^1$H-NMR spectrum and a $^{31}$P-NMR spectrum of the molybdenum compound are shown in FIGS. 4, 5, 6 and 7, respectively.

In Example 17, an IR spectrum, a UV spectrum, a $^1$H-NMR spectrum and a $^{31}$P-NMR spectrum of the molybdenum compound are shown in FIGS. 8, 9, 10 and 11, respectively.

Figure 12:
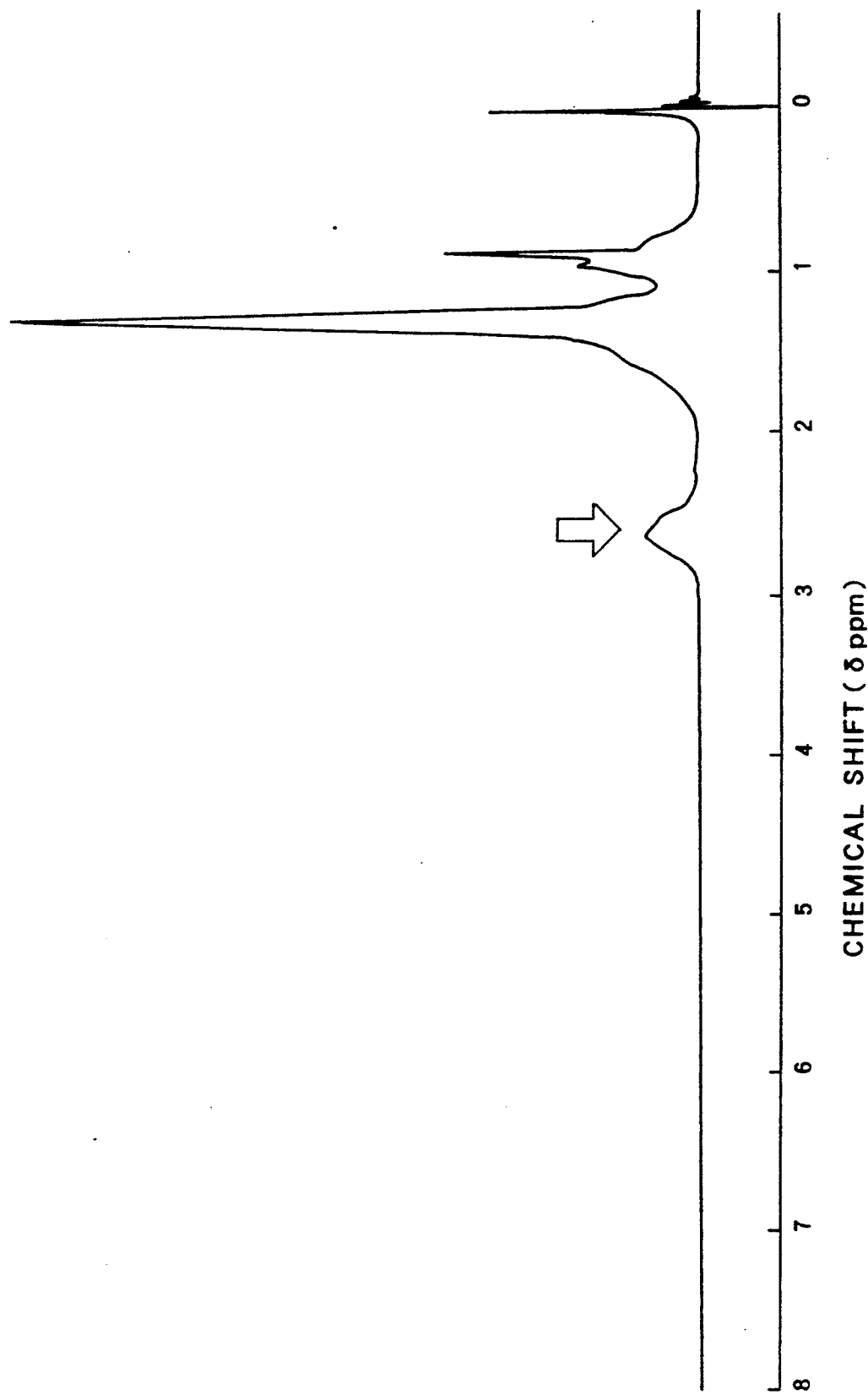
FIG. 12 shows a $^1$H-NMR spectrum of a molybdenum compound according to the present invention, obtained in Example 20, the spectrum being taken at room temperature.
Figure 13:
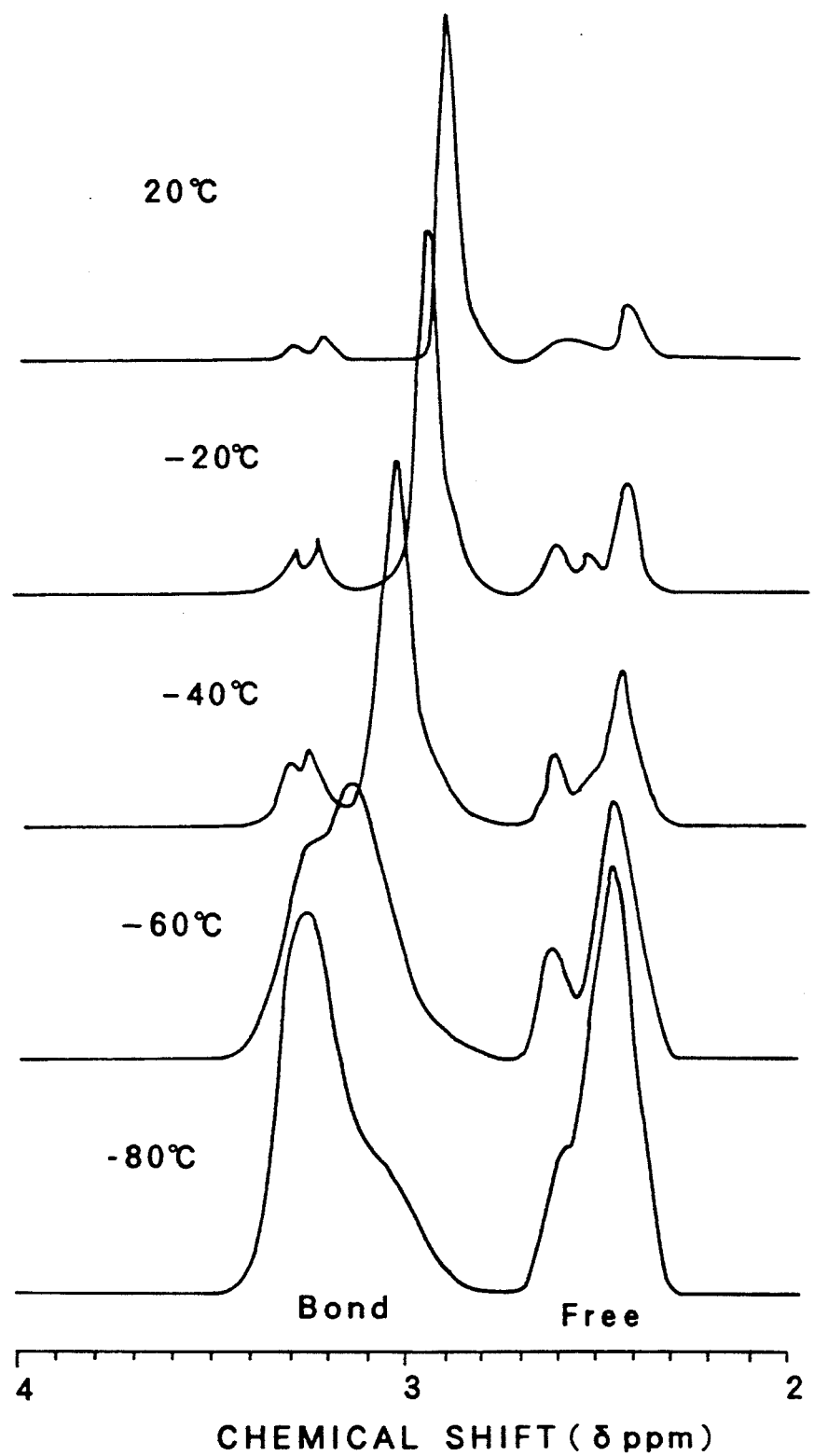
FIG. 13 shows $^1$H-NMR spectra of a molybdenum compound according to the present invention, obtained in Example 20, the spectra being taken at various temperatures of from $-80°$ to $20°$ C. for a proton of a N—CH$_2$— group.

In Example 20, a $^1$H-NMR spectrum of the molybdenum compound taken at room temperature is shown in FIG. 12, and $^1$H-NMR spectra of the proton of the methylene group of the molybdenum compound taken at lower temperatures are shown in FIG. 13, for comparison.

Figure 14:
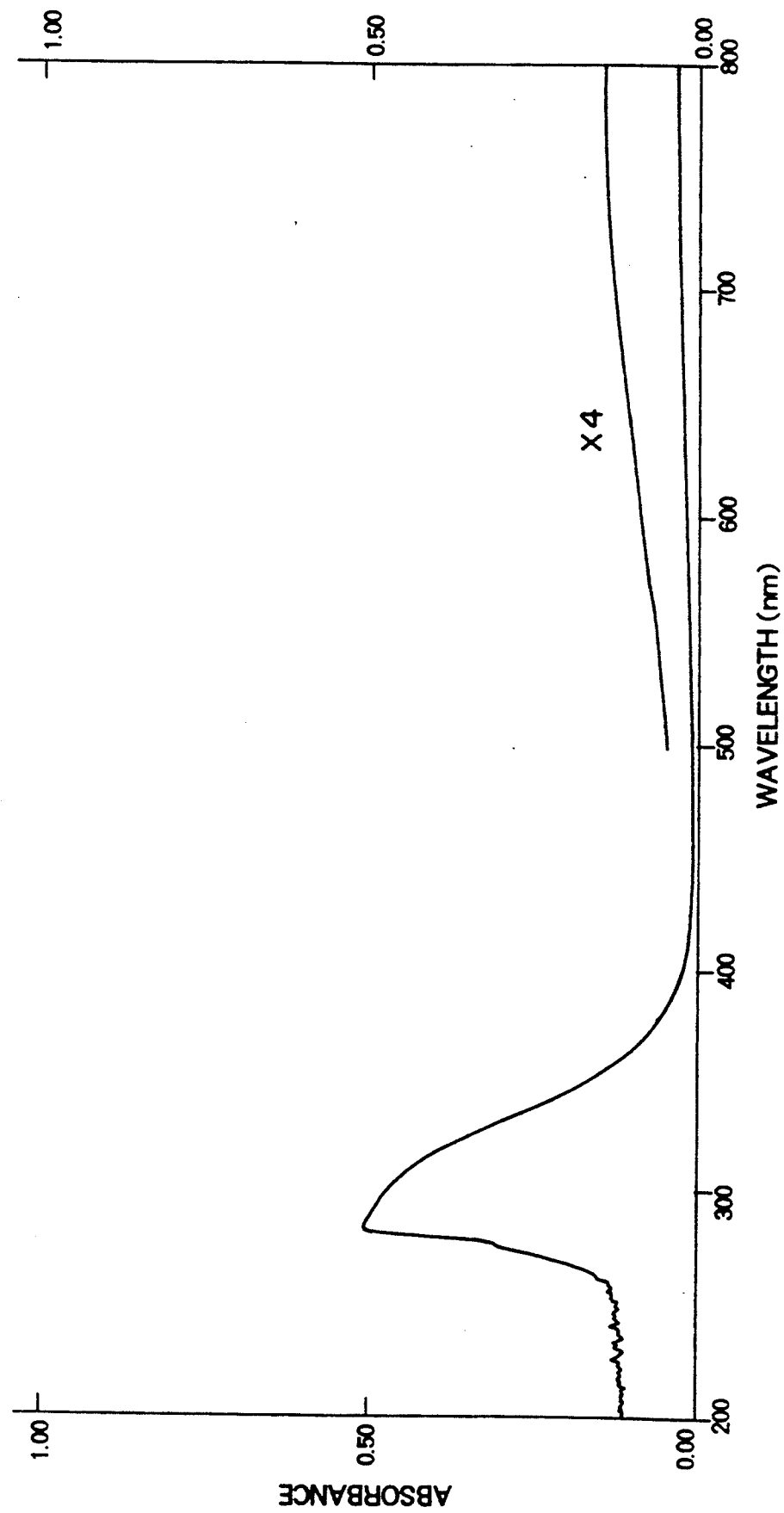
FIG. 14 shows an ultraviolet-visible light absorption spectrum of a molybdenum compound according to the present invention, obtained in Example 25.
Figure 15:
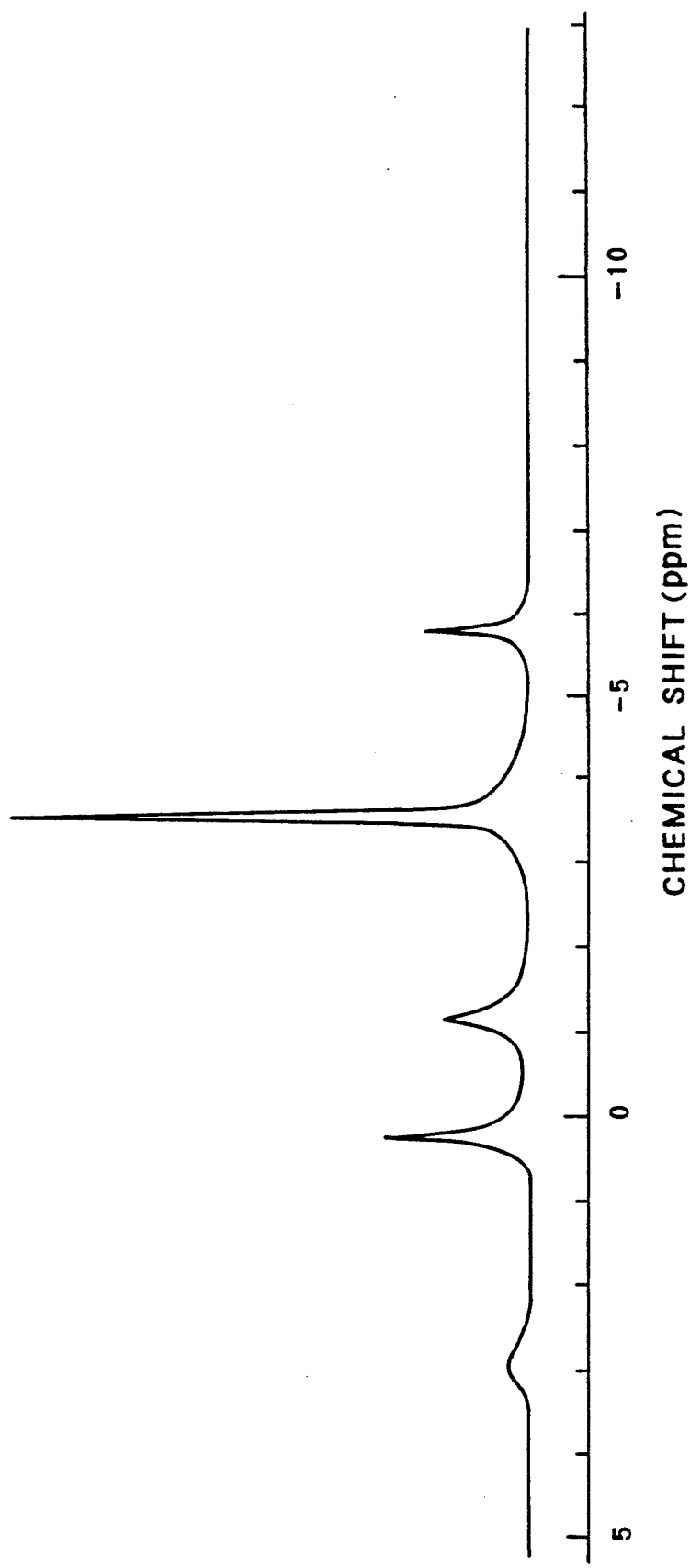
FIG. 15 shows a $^{31}$P-NMR spectrum of a molybdenum compound according to the present invention, obtained in Example 25.

In Example 25, a UV spectrum and a $^{31}$P-NMR spectrum of the molybdenum compound are shown in FIGS. 14 and 15, respectively.

Figure 16:
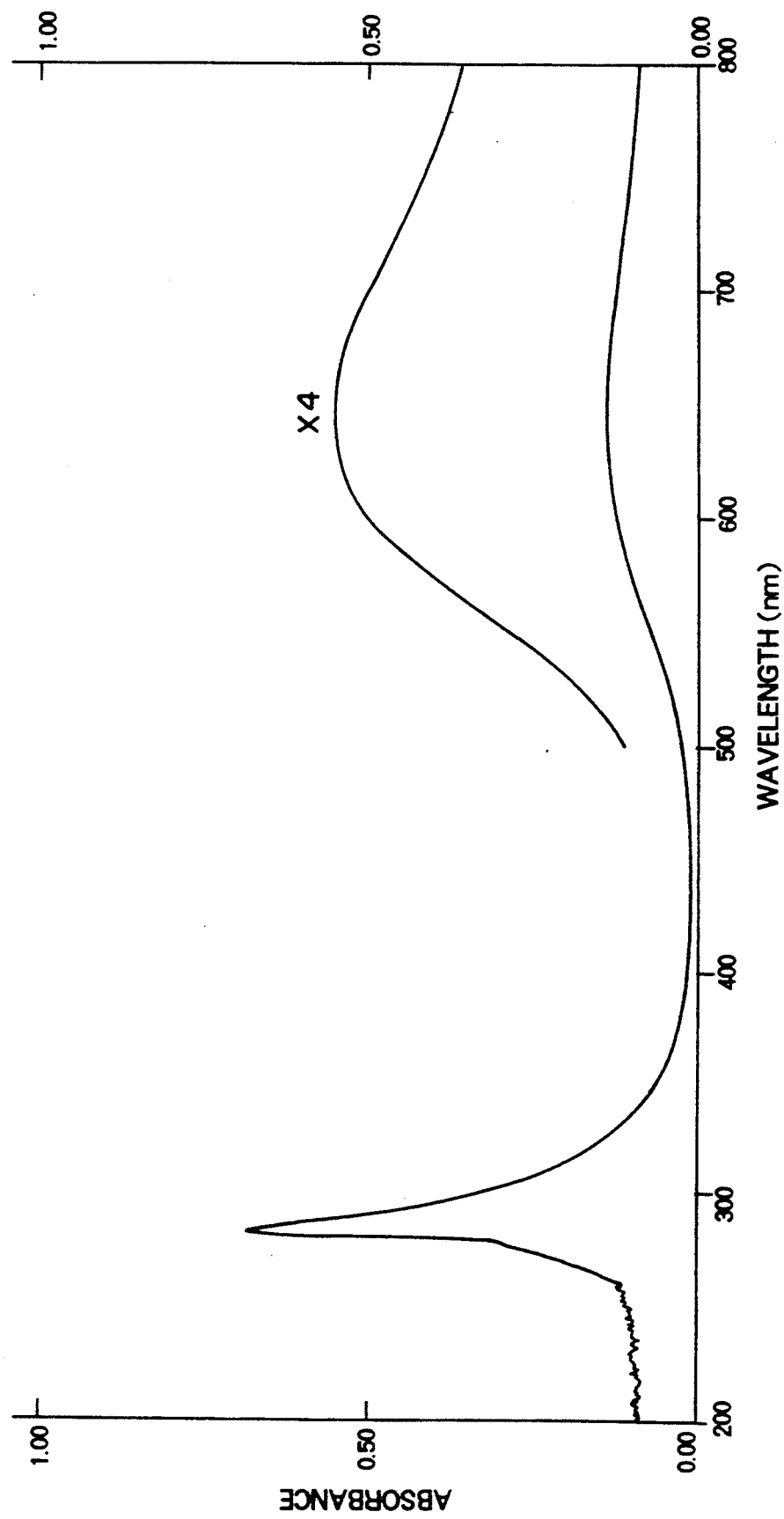
FIG. 16 shows an ultraviolet-visible light absorption spectrum of a molybdenum compound according to the present invention, obtained in Example 26.
Figure 17:
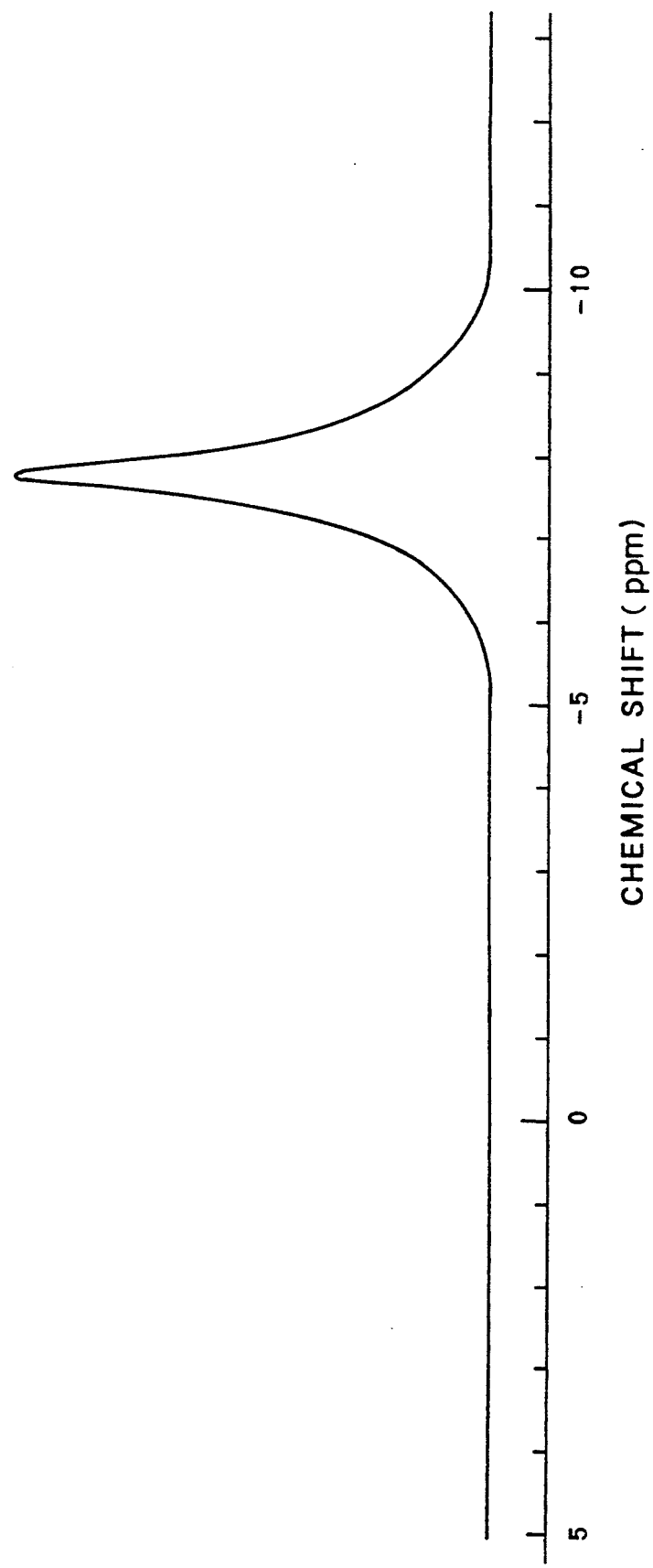
FIG. 17 shows a $^{31}$P-NMR spectrum of a molybdenum compound according to the present invention, obtained in Example 26.

In Example 26, a UV spectrum and a $^{31}$P-NMR spectrum of the molybdenum compound are shown in FIGS. 16 and 17, respectively.

Figure 18:
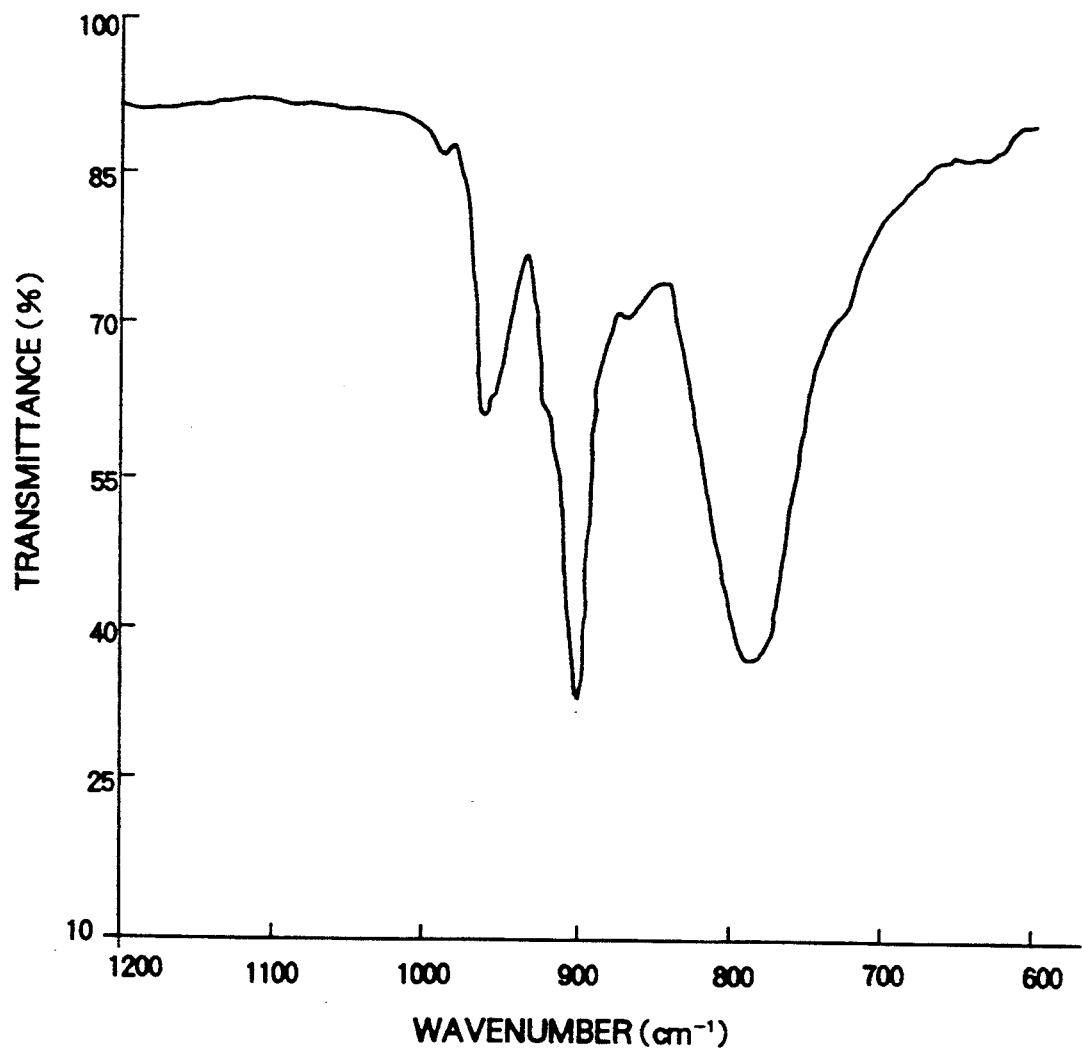
FIG. 18 shows an infrared absorption spectrum of a molybdenum compound according to the present invention, obtained in Example 28.
Figure 19:
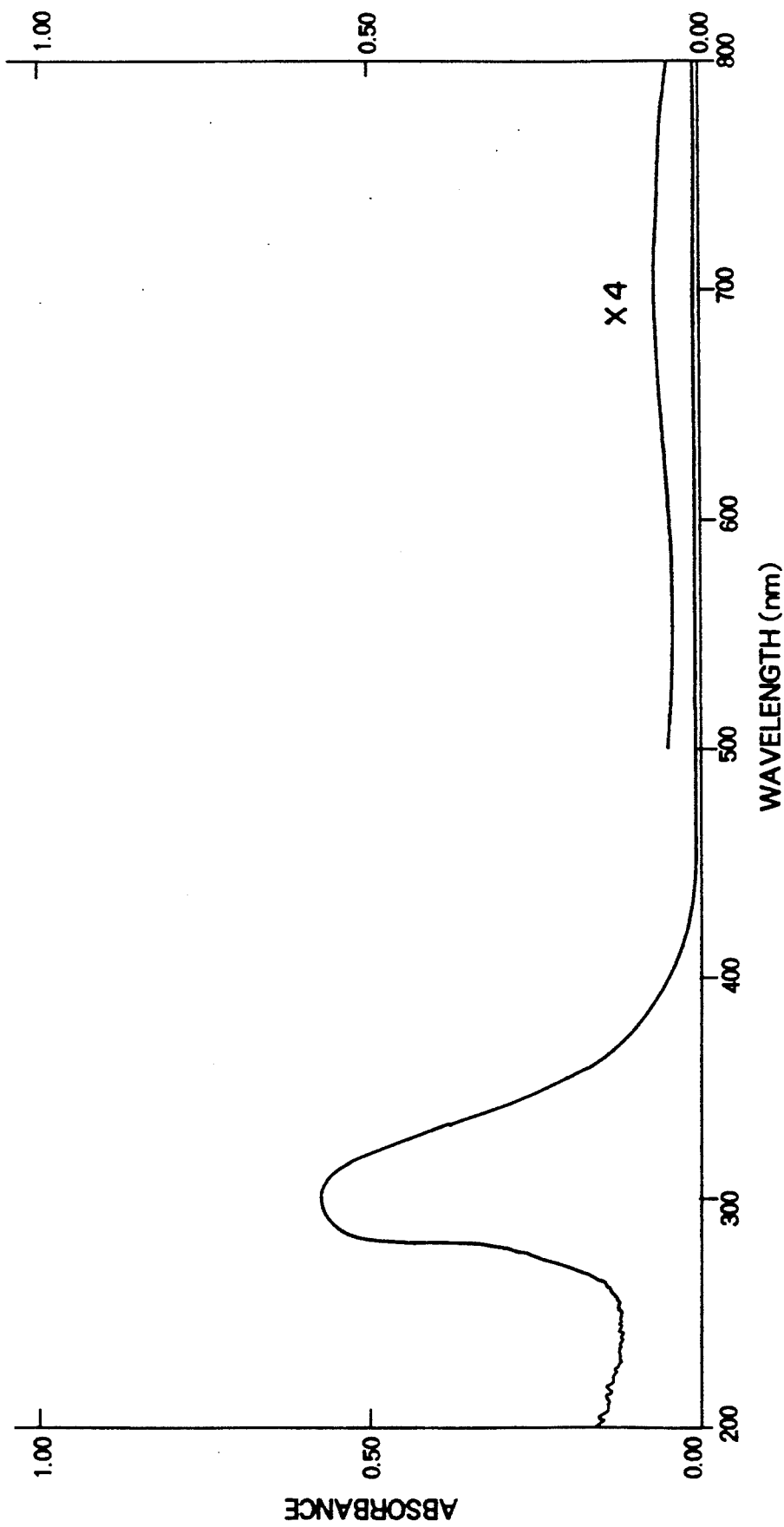
FIG. 19 shows an ultraviolet-visible light absorption spectrum of a molybdenum compound according to the present invention, obtained in Example 28.
Figure 20:
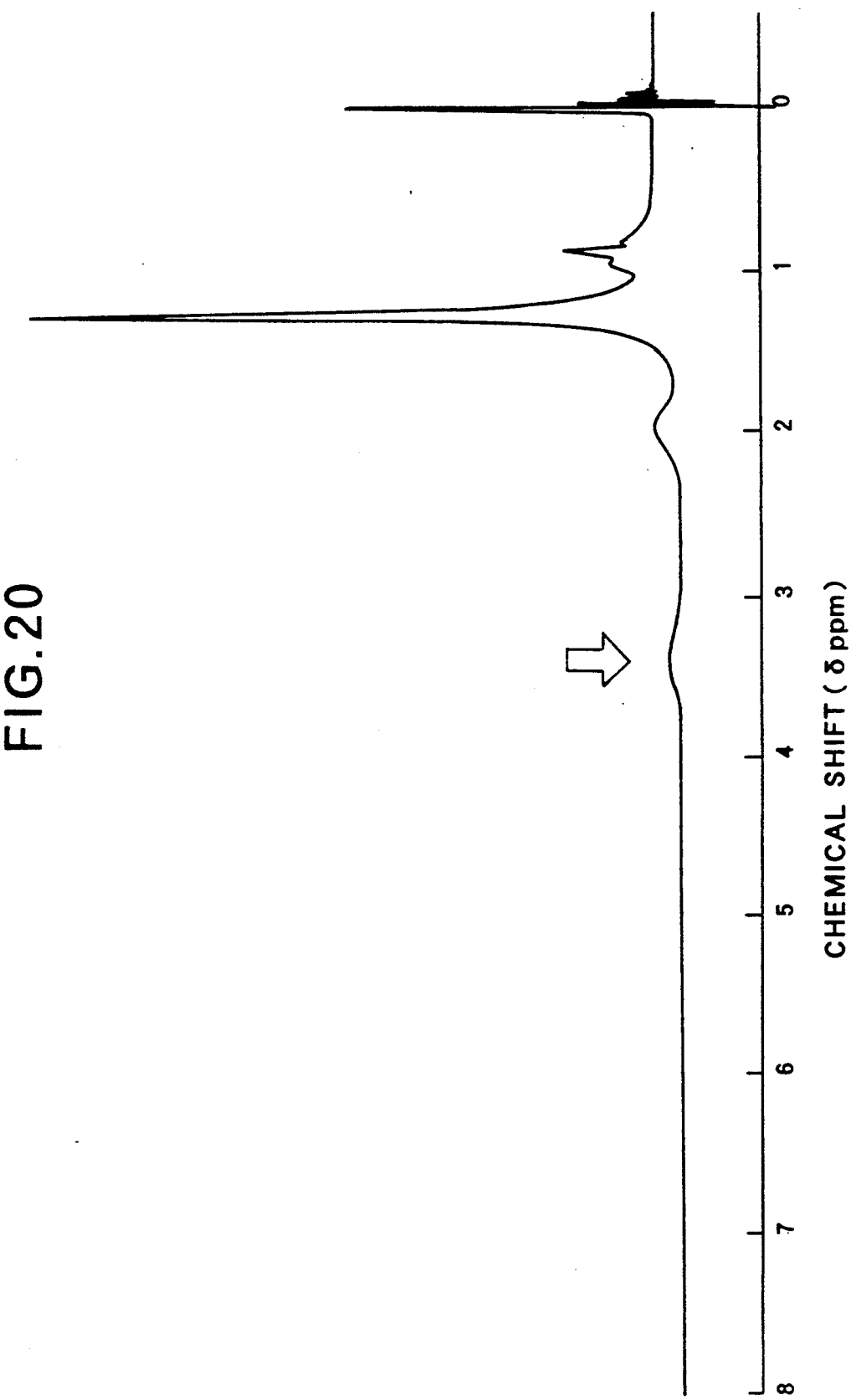
FIG. 20 shows a $^1$H-NMR spectrum of a molybdenum compound according to the present invention, obtained in Example 28.

In Example 28, an IR spectrum, a UV spectrum and a $^1$H-NMR spectrum of the molybdenum compound are shown in FIGS. 18, 19 and 20, respectively.

Figure 21:
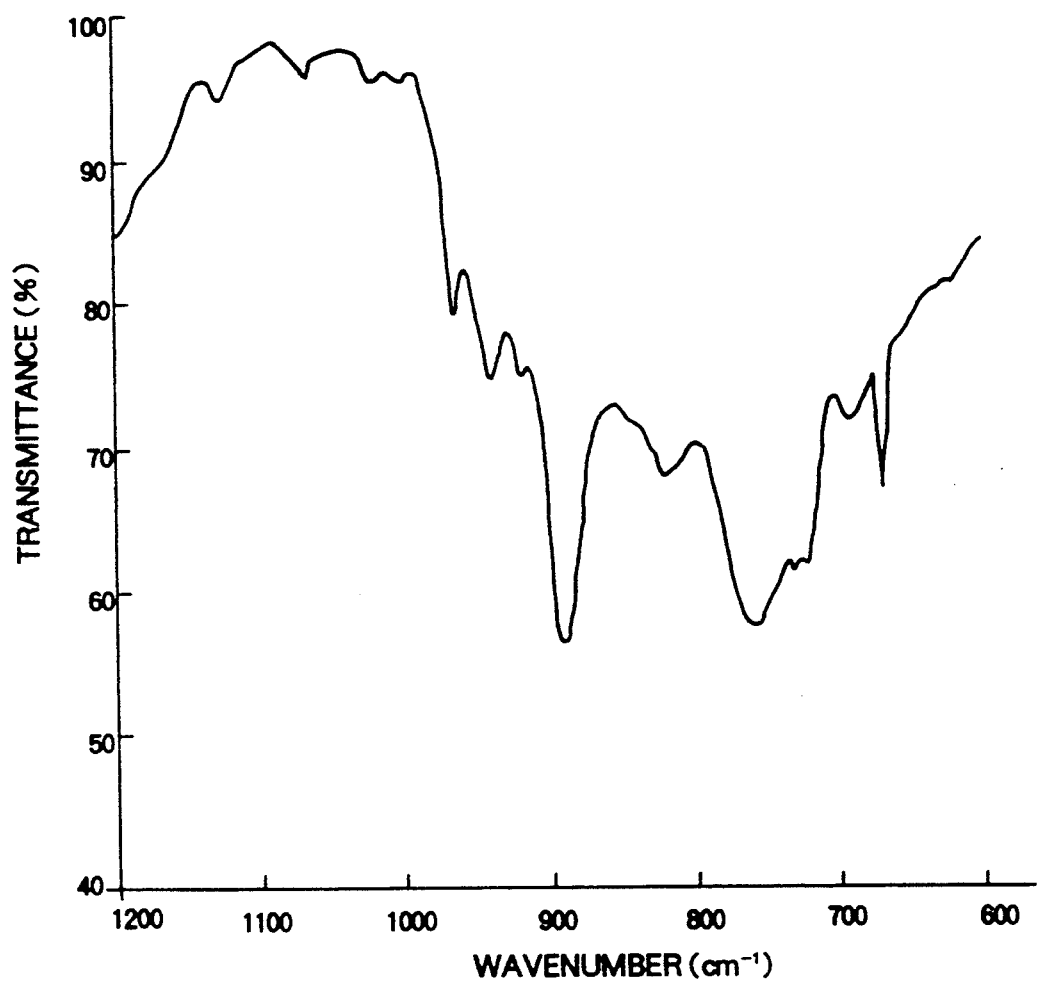
FIG. 21 shows an infrared absorption spectrum of a molybdenum compound according to the present invention, obtained in Example 29.
Figure 22:
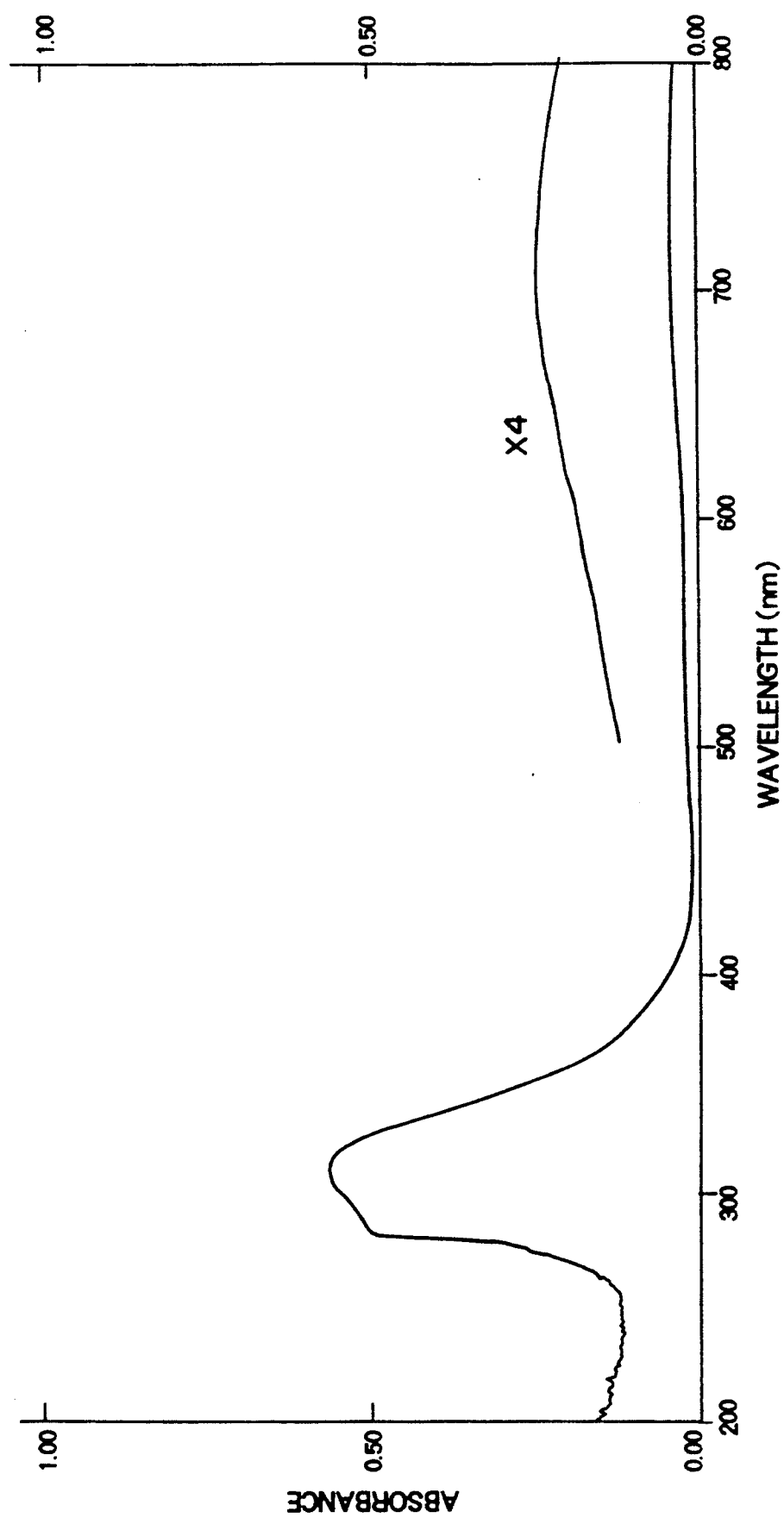
FIG. 22 shows an ultraviolet-visible light absorption spectrum of a molybdenum compound according to the present invention, obtained in Example 29.

In Example 29, an IR spectrum and a UV spectrum of the molybdenum compound are shown in FIGS. 21 and 22, respectively.

In Examples 15 to 18, each of the molybdenum compounds is subjected to oxidation-reduction titration according to the potassium permanganate method. As a result, it is found that, in Example 15, the compound is in the form reduced by 0.1 electron per mole of heteropolyacid; in Example 16, the compound is in the form reduced by 1.0 electron per mole of heteropolyacid; in Example 17, the compound is in the form reduced by 1.8 electrons per mole of heteropolyacid; and in Example 18, the compound is in the form reduced by 0.6 electron per mole of heteropolyacid.

EXAMPLE 34

300 g of toluene as a hydrocarbon oil is heated to 80° C., and 33 g of dioleylamine [$(C_{18}H_{35})_2NH$] as a secondary amine is added thereto to thereby obtain a dispersion. To the thus obtained dispersion is added 50 g of $H_3[PMo_{12}O_{40}]\cdot 29H_2O$ as a heteropolyacid, and the resultant dispersion is agitated by means of the same constant-speed stirrer as employed in Example 12 under the same conditions as followed in Example 12. As a result, a molybdenum compound represented by the formula shown in Table 17 is produced. After completion of the agitation operation, the dispersion is allowed to stand for two hours to thereby separate into a toluene phase and an aqueous phase containing the crystal water of the heteropolyacid hydrate. The molybdenum concentration of the toluene solution by the fluorescent X-ray method is 6.6% by weight.

In this Example, an IR spectrum, a UV spectrum, a $^1$H-NMR spectrum and a $^{31}$P-NMR spectrum of the molybdenum compound exhibit peak values as follows:

IR:1055(m) cm$^{-1}$, 959(s) cm$^{-1}$, 848(m) cm$^{-1}$, 784(s) cm$^{-1}$.

UV:310(s) nm, 700(w) nm.

$^1$H-NMR:3.5 ppm.

$^{31}$P-NMR:−1.5(s) ppm.

EXAMPLE 35

180 g of powdery molybdenum trioxide (MoO$_3$) and 8 g of an aqueous phosphoric acid solution (concentration: 75% by weight) are added to a solution consisting of 500 g of deionized water and 300 g of isopropyl alcohol and then, the resultant mixture is heated at 80° C. for 6 hours, thereby obtaining a solution of a molybdenum compound of the formula $H_3[PMo_{12}O_{40}]$. Subsequently, the isopropyl alcohol and the water are removed by distillation to thereby concentrate the molybdenum compound solution. In order to remove a trace amount (as small as 0.5 g) of insoluble matter, the thus obtained solution is subjected to filtration, thereby obtaining a filtrate. The molybdenum concentration in the resultant filtrate as measured by the emission spectroscopic analysis is 17.0% by weight. Separately, 300 g of toluene as a hydrocarbon oil is heated at 80° C., and 56 g of didocosenyl amine [$(C_{22}H_{43})_2NH$] is added to the heated toluene to thereby obtain a dispersion. To the thus obtained dispersion is poured 150 g of the above-mentioned filtrate, and thereafter, the resultant mixture is agitated by means of the same constant-speed stirrer as employed in Example 12 under the same conditions as followed in Example 12. As a result, a molybdenum compound comprised of species represented by the formulae shown in Table 17 is obtained. After completion of the agitation operation, the resultant dispersion is allowed to stand for two hours to thereby separate into a toluene phase and an aqueous phase. The molybdenum concentration in the toluene solution as measured by the fluorescent X-ray method is 6.4% by weight. The molybdenum concentration in the aqueous solution as measured by emission spectroscopic analysis is 80 ppm. Further, the concentration of isopropyl alcohol in the toluene solution is determined by gas chromatography, and found to be 1.0% by weight. The concentration of water in the toluene solution is determined by Karl Fischer's method, and found to be 0.8% by weight.

In this Example, an IR spectrum, a UV spectrum, a $^1$H-NMR spectrum and a $^{31}$P-NMR spectrum of the molybdenum compound exhibit the following peaks.

IR:1055(m) cm$^{-1}$, 951(s) cm$^{-1}$, 860(m) cm$^{-1}$, 789(s) cm$^{-1}$,

UV:310(s) nm.

$^1$H-NMR:3.3 ppm.

$^{31}$P-NMR:−1.5(s) ppm.

EXAMPLE 36

Substantially the same procedure as described in Example 35 is repeated, except that 68 g of trioleylamine [$(C_{18}H_{35})_3N$] is used as an amine, thereby obtaining a molybdenum compound dissolved in toluene. The molybdenum compound is comprised of species represented by the formulae shown in Table 17. The molybdenum concentration of the toluene solution as measured by the fluorescent X-ray method is found to be 6.2% by weight.

In this Example, an IR spectrum, a UV spectrum, a $^1$H-NMR spectrum and a $^{31}$P-NMR spectrum of the molybdenum compound exhibit the following peaks.

IR:1055(m) cm$^{-1}$, 951(s) cm$^{-1}$, 860(m) cm$^{-1}$, 789(s) cm$^{-1}$.
UV:310(s) nm
$^1$H-NMR:3.3 ppm.
$^{31}$P-NMR:−1.6(s) ppm.

EXAMPLE 37

75 g of sodium molybdate ($Na_2MoO_4.2H_2O$) and 3 g of an aqueous phosphoric acid solution (concentration: 85% by weight) are added to a solution comprised of 120 g of deionized water and 88 g of nitric acid (concentration: 60 to 62% by weight), thereby preparing an aqueous solution. Separately, 300 g of toluene as a hydrocarbon oil is heated at 80° C., and then, 53 g of dioleylamine [$(C_{18}H_{35})_2NH$] as a secondary amine is added thereto, thereby obtaining a dispersion. To the dispersion is poured the total amount of the above-mentioned aqueous solution, and then, the resultant mixture is agitated by means of the same constant-speed stirrer as employed in Example 12 under the same conditions as followed in Example 12. As a result, a molybdenum compound comprised of species represented by the formulae shown in Table 17 is produced. After completion of the agitation operation, the resultant mixture is allowed to stand for two hours, thereby separating into a toluene solution phase and an aqueous phase. The Mo concentration of the toluene solution as measured by the fluorescent X-ray method is 7.4% by weight, and the Mo concentration in the aqueous solution as measured by emission spectroscopic analysis is 60 ppm.

In this Example, an IR spectrum, a UV spectrum, a $^1$H-NMR spectrum and $^{31}$P-NMR spectrum of the molybdenum compound exhibit the following peaks.

IR:1055(m) cm$^{-1}$, 959(s) cm$^{-1}$, 848(m) cm$^{-1}$, 784(s) cm$^{-1}$.
UV:310(s) nm.
$^1$H-NMR:3.4 ppm.
$^{31}$P-NMR:−2.6(s) ppm.

COMPARATIVE EXAMPLES 1 TO 10

In Comparative Examples 1 to 8, comparative molybdenum compounds in a suspended form are separately obtained in substantially the same manner as in Example 7, except that aqueous heteropolyacid solutions and amines shown in Table 9 are used.

In comparative Examples 9 and 10, comparative molybdenum compounds in a solution form are separately obtained in substantially the same manner as in Example 12, except that aqueous heteropolyacid solutions and amines shown in Table 9 are used.

The Mo concentrations and tungsten concentrations of the thus obtained comparative molybdenum compounds are also shown in Table 9.

EXAMPLES 38 TO 74 AND COMPARATIVE EXAMPLES 11 TO 20

Batch reactions are separately conducted, using as a reaction apparatus an electromagnetic stirrer type autoclave made of stainless steel (SUS 316) which has an internal volume of 1 liter and is provided with an external coil heater, and using as a feedstock oil the same residual oil obtained by vacuum distillation of Khafji crude oil as used in Example 7. The autoclave is charged with 200 g of a mixture of the feedstock oil and a molybdenum compound. The molybdenum compound is added in such an amount that the Mo concentration of the feedstock oil is 150 ppmw. Next, a hydrogen gas is charged into the autoclave at room temperature so that the hydrogen gas pressure inside the autoclave becomes 140 kg/cm$^2$. The autoclave is sealed, and reaction is carried out at an internal temperature of 460° C. for 60 minutes while agitating at 1000 rpm by means of a stirrer provided with a three-blade propeller in order to attain gas-liquid contact and fluid mixing. The above-mentioned reaction time of 60 minutes means a period of time in which the internal temperature of the autoclave is kept at 460° C., which period does not include the time required to elevate the temperature (elevation rate: 6° C./min) thereto from room temperature and the time required to lower the temperature (lowering rate: 15° C./min) therefrom to room temperature. All of a reaction product comprised of a gas and a suspension is collected and subjected to analyses. That is, a gas component is subjected to gas chromatography, an oil product is subjected to distillation analysis in accordance with ASTM D-1160 using a distillation apparatus, and polycondensate is subjected to solvent extraction analysis.

The results obtained by using molybdenum compounds prepared in Examples 1 to 10 are shown in Table 10.

The results obtained by using molybdenum compounds prepared in Examples 11 to 20 are shown in Table 11.

The results obtained by using molybdenum compounds prepared in Examples 21 to 30 are shown in Table 12.

The results obtained by using molybdenum compounds prepared in Examples 31 to 37 are shown in Table 13, The results obtained by using molybdenum compounds prepared in Comparative Examples 1 to 10 are shown in Table 14.

Hydroconversion ratio, i.e., degree of conversion of a feedstock oil to a light hydrocarbon oil, is defined by the following formula:

$$\left(1 - \frac{\text{weight \% of fractions having a b.p. of 520° C. or higher in product}}{\text{weight \% of fractions having a b.p. of 520° C. or higher in feedstock}}\right) \times 100$$

(% by weight).

Asphaltene is defined as a polycondensate which is insoluble in hexane at the time of hexane extraction, but soluble in tetrahydrofuran at the time of tetrahydrofuran extraction. Further, coke is defined as a polycondensate which is insoluble in tetrahydrofuran at the time of tetrahydrofuran extraction. As mentioned above, both asphaltene and coke are products of coking reaction. The occurrence or non-occurrence of coking inside the autoclave is judged on observation results as to whether, after taking out the product, there remains a solid adhering to the inside wall of the autoclave, to the stirrer, and to the protective tube of a thermocouple (for measuring an internal temperature) as strongly as the solid cannot be removed without a mechanical force.

EXAMPLES 75 AND 76

Hydroconversion is conducted in a continuous manner, using a stainless steel(SUS 316)-made flow reactor apparatus, which is comprised of a preheater composed of a spiral pipe of 3 mm in inner diameter and 5 m in length, a high pressure reactor apparatus provided with a gas-liquid upstream column reactor of 21 mm in inner diameter and 2.5 m in height, and a distillation apparatus having a flash tower of 36 mm in inner diameter and 3 m in height which is capable of separating a hydroconversion oil product into fractions by blowing a nitrogen gas.

As a feedstock oil, use is made of the same vacuum distillation residual oil from Khafji crude oil as employed in the above run conducted in the autoclave. To the feedstock oil is added fine powdery silica produced by the dry process (average primary particle size measured by an electron microscope: 16 nm, specific surface area measured by the BET method: 200 m²/g) in an amount such that the silica concentration of the oil is 0.8% by weight, and the silica is immersed in the oil. Further, to the resultant mixture, the molybdenum compound obtained in Example 15 is added in Example 75, and the molybdenum compound obtained in Example 17 is added in Example 76, in an amount such that the Mo concentration is 150 ppmw. Each of the thus obtained mixtures is thoroughly agitated by means of a stirrer having a three-blade propeller at a revolution rate of 500 rpm, and subjected to hydroconversion reaction.

In each of Examples 75 and 76, the hydroconversion is conducted at 485° C. at a retention time of 30 minutes under a reaction pressure of 200 kg/cm² in a hydrogen-/oil volume ratio of 1000N liters/liter for 200 hours in a one-through reaction manner. The retention time (t) is defined by the equation:

$$t = \frac{V_0}{V_1} \times 60$$

wherein
$V_0$ is the capacity of the reactor vessel and
$V_1$ is the feed rate (liter/h) of the mixture of the feedstock and the molybdenum compound.

The hydroconversion is stably performed throughout the operation period without causing any coking to occur anywhere within the reactor and flow apparatus. Reaction products are subjected to analyses and the results are shown in Table 15.

EXAMPLES 77 AND 78

Hydroconversion is conducted in a continuous manner, using substantially the same reactor apparatus as employed in Examples 75 and 76, except that the reactor apparatus is additionally provided with a circulation line for mixing a portion of bottom oil remaining in the flash tower with a feedstock oil and thereafter introducing the resultant mixture into a reaction zone.

As a feedstock oil, use is made of the above-mentioned residual oil obtained by vacuum distillation of Khafji crude oil. To this residual oil is added a powdery oil furnace carbon black (average primary particle size measured by an electron microscope: 20 nm, specific surface area measured by a BET method: 130 m²/g) in an amount such that the carbon black concentration of the oil is 0.3% by weight, and the carbon black is immersed in the oil, followed by mixing. Further, to the mixture, the molybdenum compound obtained in Example 25 is added in Example 77 and the molybdenum compound obtained in Example 29 is added in Example 78, in an amount such that the Mo concentration is 40 ppmw.

In each of Examples 77 and 78, hydroconversion is continuously conducted by the use of the above-mentioned reactor apparatus for a period of 200 hours under conditions such that the temperature is 478° C., the retention time defined in Examples 75 and 76 is 30 minutes, the pressure is 200 kg/cm², the volume ratio of hydrogen/oil containinq carbon black and molybdenum compound is 1000N liters/liter, the recycle ratio (weight ratio of recycled oil/feedstock oil containing carbon black and molybdenum compound) is 0.4 and the temperature at which distilled fractions are separated in the flash tower is 520° C. The hydroconversion is stably performed throughout the operation period without causing any coking to occur anywhere within the reactor and flow apparatus. Reaction products are subjected to analyses, and the results are shown in Table 16.

TABLE 1

| Ex.*1 No. | Heteropolyacid Type | Amt. of*2 heteropolyacid (g) | Amine Type | Amt. (g) | Molar ratio of amine/ heteropolyacid (charged) | Molybdenum concentration of suspension (wt %) |
|---|---|---|---|---|---|---|
| 2 | 20 wt % aqueous solution of $H_3[PMo_{12}O_{40}] \cdot 29H_2O$ | 30 | docosylamine $C_{22}H_{45}NH_2$ | 13 | 3 | 4.1 |
| 3 | 20 wt % aqueous solution of $H_4[SiMo_{12}O_{40}] \cdot 30H_2O$ | 30 | dihydrogenated tallowamine $C_{18}H_{37}NH_2$ | 20 | 6 | 4.0 |
| 4 | 20 wt % aqueous solution of $H_4[SiMo_{12}O_{40}] \cdot 30H_2O$ | 30 | octadecyl- dimethylamine $(C_{18}H_{37})(CH_3)_2N$ | 16 | 4 | 4.0 |
| 5 | 20 wt % aqueous solution of $Ni_3[PMo_{12}O_{40}]_2 \cdot 31H_2O$ | 30 | hexadecyl- methylamine $(C_{16}H_{33})(CH_3)NH$ | 21 | 12 | 4.3 |
| 6 | 20 wt % aqueous solution of $Co_3[PMo_{12}O_{40}]_2 \cdot 29H_2O$ | 4 | hexadecyl- dimethylamine | 3 | 12 | 1.0 |

TABLE 1-continued

| Ex.[1] No. | Heteropolyacid Type | Amt. of[2] heteropolyacid (g) | Amine Type | Amt. (g) | Molar ratio of amine/ heteropolyacid (charged) | Molybdenum concentration of suspension (wt %) |
|---|---|---|---|---|---|---|
| | | | $(C_{16}H_{33})(CH_3)_2N$ | | | |

[1]Ex.: Example
[2]Amt.: Amount

TABLE 2

| Ex. No. | Heteropolyacid Type | Amt. of heteropolyacid (g) | Amine Type | Amt. (g) | Molar ratio of amine/ heteropolyacid (charged) | Molybdenum concentration of suspension (wt %) |
|---|---|---|---|---|---|---|
| 8 | 50 wt % aqueous solution of 5-electron reduced species of $H_{12}[SiMo_9V_3O_{40}]\cdot 26H_2O$ | 100 | didocosadienylamine $(C_{22}H_{41})_2NH$ | 346 | 12 | 3.9 |
| 9 | 50 wt % aqueous solution of $H_4[SiMo_9W_3O_{40}]\cdot 22H_2O$ | 100 | dioleylamine $(C_{18}H_{35})_2NH$ | 125 | 6 | 4.3 |
| 10 | 50 wt % aqueous solution of $H_3[CoMo_6O_{24}H_6]\cdot 12H_2O$ | 15 | decyldimethylamine $(C_{10}H_{21})(CH_3)_2N$ | 7 | 3 | 1.1 |

TABLE 3

| Ex. No. | Heteropolyacid Type | Amt. of heteropolyacid (g) | Amine Type | Amt. (g) | Hydrocarbon solvent Type | Amt. (g) | Molar ratio of amine/ heteropolyacid | Molybdenum concentration of hydrocarbon solution (wt %) |
|---|---|---|---|---|---|---|---|---|
| 13 | 25 wt % aqueous solution of $H_3[PMo_{12}O_{40}]\cdot 29H_2O$ | 50 | didodecylamine $(C_{12}H_{25})_2NH$ | 45 | cyclohexane | 300 | 6 | 6.4 |
| 14 | 25 wt % aqueous solution of $H_3[PMo_{12}O_{40}]\cdot 29H_2O$ | 50 | dihexadecylamine $(C_{16}H_{33})_2NH$ | 59 | cyclohexane | 300 | 6 | 6.2 |
| 15 | 25 wt % aqueous solution of $H_3[PMo_{12}O_{40}]\cdot 29H_2O$ | 150 | dioleylamine $(C_{18}H_{35})_2NH$ | 100 | toluene | 400 | 3 | 11.9 |
| 16 | 25 wt % aqueous solution of $H_3[PMo_{12}O_{40}]\cdot 29H_2O$ | 50 | dioleylamine $(C_{18}H_{35})_2NH$ | 55 | cyclohexane | 300 | 5 | 6.2 |
| 17 | 25 wt % aqueous solution of $H_3[PMo_{12}O_{40}]\cdot 29H_2O$ | 150 | dioleylamine $(C_{18}H_{35})_2NH$ | 200 | hexane | 900 | 6 | 6.1 |
| 18 | 25 wt % aqueous solution of $H_3[PMo_{12}O_{40}]\cdot 29H_2O$ | 50 | dioleylamine $(C_{18}H_{35})_2NH$ | 99 | hexane | 1000 | 9 | 2.2 |
| 19 | 25 wt % aqueous solution of $H_3[PMo_{12}O_{40}]\cdot 29H_2O$ | 200 | tridecylamine $(C_{10}H_{21})_3N$ | 220 | cyclohexane | 200 | 6 | 17.1 |
| 20 | 25 wt % aqueous solution of $H_3[PMo_{12}O_{40}]\cdot 29H_2O$ | 50 | tridecylamine $(C_{10}H_{21})_3N$ | 110 | cyclohexane | 300 | 12 | 5.5 |

TABLE 4

| Ex. No. | Heteropolyacid Type | Amt. of heteropolyacid (g) | Amine Type | Amt. (g) | Hydrocarbon solvent Type | Amt. (g) | Molar ratio of amine/ heteropolyacid (charged) | Molybdenum concentration of hydrocarbon solution (wt %) |
|---|---|---|---|---|---|---|---|---|
| 21 | 25 wt % aqueous solution of $H_3[PMo_{12}O_{40}]\cdot 29H_2O$ | 50 | tridodecylamine $(C_{12}H_{25})_3N$ | 39 | toluene | 300 | 3.5 | 6.5 |
| 22 | 25 wt % aqueous solution of $H_3[PMo_{12}O_{40}]\cdot 29H_2O$ | 50 | tridodecylamine $(C_{12}H_{25})_3N$ | 67 | hexane | 300 | 6 | 6.0 |
| 23 | 25 wt % aqueous solution of $H_3[PMo_{12}O_{40}]\cdot 29H_2O$ | 50 | trihexadecylamine $(C_{16}H_{33})_3N$ | 88 | hexane | 300 | 6 | 5.7 |
| 24 | 25 wt % aqueous solution of 2-electron reduced species of $H_5[PMo_{12}O_{40}]\cdot 29H_2O$ | 50 | tridodecylamine $(C_{12}H_{25})_3N$ | 67 | hexane | 300 | 6 | 6.0 |
| 25 | 25 wt % aqueous solution of $H_6[P_2Mo_{18}O_{62}]\cdot 36H_2O$ | 150 | dioleylamine $(C_{18}H_{35})_2NH$ | 230 | toluene | 900 | 10 | 6.0 |
| 26 | 25 wt % aqueous solution of 4-electron reduced species of $H_{10}[P_2Mo_{18}O_{62}]\cdot 36H_2O$ | 50 | dioleylamine $(C_{18}H_{35})_2NH$ | 75 | toluene | 300 | 10 | 6.0 |
| 79 | 25 wt % aqueous solution of 2-electron reduced species of $H_5[PMo_{12}O_{40}]\cdot 29H_2O$ | 50 | tridodecylamine $(C_{12}H_{25})_3N$ | 33 | toluene | 300 | 3 | 6.6 |
| 80 | 25 wt % aqueous solution of 4-electron reduced species of $H_{10}[P_2Mo_{18}O_{62}]\cdot 36H_2O$ | 50 | dioleylamine $(C_{18}H_{35})_2NH$ | 45 | toluene | 300 | 6 | 6.5 |

TABLE 5

| Ex. No. | Heteropolyacid Type | Amt. of heteropolyacid (g) | Amine Type | Amt. (g) | Hydrocarbon solvent Type | Amt. (g) | Molar ratio of amine/ heteropolyacid (charged) | Molybdenum concentration of hydrocarbon solution (wt %) |
|---|---|---|---|---|---|---|---|---|
| 27 | 25 wt % aqueous solution of $H_3[AsMo_{12}O_{40}]\cdot 28H_2O$ | 50 | diicosylamine $(C_{20}H_{41})_2NH$ | 37 | toluene | 300 | 3 | 6.4 |
| 28 | 25 wt % aqueous solution of $H_4[SiMo_{12}O_{40}]\cdot 30H_2O$ | 50 | distearylamine $(C_{18}H_{37})_2NH$ | 44 | toluene | 300 | 4 | 6.4 |
| 29 | 25 wt % aqueous solution of $H_4[SiMo_{12}O_{40}]\cdot 30H_2O$ | 150 | ditetradecylamine $(C_{14}H_{29})_2NH$ | 310 | cyclohexane | 900 | 12 | 5.5 |
| 30 | 25 wt % aqueous solution of $Na_4[SiMo_{12}O_{40}]\cdot 9H_2O$ | 50 | tripalmithylamine $(C_{16}H_{31})_3N$ | 99 | hexane | 300 | 6 | 6.2 |
| 31 | 25 wt % aqueous solution of $H_4[GeMo_{12}O_{40}]\cdot 24H_2O$ | 50 | dioleylamine nitrate $(C_{18}H_{35})_2NHHNO_3$ | 51 | toluene | 300 | 4 | 6.5 |
| 32 | 25 wt % aqueous solution of $H_4[GeMo_{12}O_{40}]\cdot 24H_2O$ | 50 | dioleylamine hydrochloride $(C_{18}H_{35})_2NHHCl$ | 49 | toluene | 300 | 4 | 6.5 |
| 33 | 25 wt % aqueous solution of $H_4[GeMo_{12}O_{40}]\cdot 24H_2O$ | 50 | trihexadecylamine nitrate $(C_{16}H_{33})_3NHNO_3$ | 66 | toluene | 300 | 4 | 6.2 |

TABLE 6

| Ex. | IR (cm$^{-1}$) | UV (nm) | $^1$H-NMR (ppm) | $^{31}$P-NMR (ppm) |
|---|---|---|---|---|
| 13 | 1055,954,784 (m) (s) (s) | 310,700 (s) (s) | 3.4 | +0.1,−1.4,−5.0 (m) (s) (s) |
| 14 | 1055,954,784 (m) (s) (s) | 310,700 (s) (s) | 3.5 | +0.2,−1.2,−5.2 (s) (m) (s) |
| 15 | 1055,959,848,784 (m) (s) (m)(s) | 310 (s) | 3.4 | −1.5 (s) |
| 16 | 1055,954,784 (m) (s) (s) | 310,710 (s) (m) | 3.6 | +0.2,−1.2,−3.0 (s) (s) (s) |
| 17 | 1055,954,784 (m) (s) (s) | 310,700 (s) (s) | 3.5 | +0.1,−1.2,−5.5 (s) (m) (s) |
| 18 | 1055,954,784 (m) (s) (s) | 310,700 (m)(w) | 3.3 | +3.5,+1.8,+0.4,−5.7 (m) (s) (m) (w) |
| 19 | 1055,954,784 (m) (s) (s) | 310,710 (s) (s) | 3.3 | +0.5,−1.4,−5.5 (w) (m) (s) |
| 20 | 1055,954,784 (m) (s) (s) | 310,710 (m)(s) | 2.7 | +0.5,−5.5 (w) (s) |

In Example 15, an IR spectrum, a UV spectrum, a $^1$H-NMR spectrum and a $^{31}$P-NMR spectrum are shown in FIGS. 4, 5, 6 and 7, respectively.
In Example 17, an IR spectrum, a UV spectrum, a $^1$H-NMR spectrum and a $^{31}$P-NMR spectrum are shown in FIGS. 8, 9, 10 and 11, respectively.
In Example 20, a $^1$H-NMR spectrum at room temperature is shown in Fig. 12, and $^1$H-NMR spectra at lower temperatures are shown in FIG. 13, for comparison.

TABLE 7

| Ex. | IR (cm$^{-1}$) | UV (nm) | $^1$H-NMR (ppm) | $^{31}$P-NMR (ppm) |
|---|---|---|---|---|
| 21 | 1055,959,848,784 (m) (s) (m)(s) | 310,710 (s) (w) | 3.3 | −1.2,−2.2 (w) (s) |
| 22 | 1055,954,784 (m) (s) (s) | 310,700 (s) (s) | 3.3 | +0.4,−1.5,−5.6 (m) (m) (s) |
| 23 | 1055,954,784 (m) (s) (s) | 310,710 (s) (s) | 3.3 | +0.4,−1.4,−5.5 (m) (m) (s) |
| 24 | 1055,954,784 (m) (s) (s) | 700 (s) | 3.3 | −5.7 (s) |
| 25 | 1100,970,930, 860,800 (s) (s) (s) (m)(s) | 310,800 (m)(w) | 3.5 | +0.3,−1.1,−3.5,−5.8 (m) (s) (s) (m) |
| 26 | 1100,970,930 (s) (s) (s) 860,800 (m)(s) | 650 (s) | 3.4 | −7.7 (s) |
| 79 | 1055,959,848,784 (m) (s) (m)(s) | 700 (s) | 3.3 | −5.7 (s) |
| 80 | 1100,970,930 (s) (s) (s) 860,800 (m)(s) | 650 (s) | 3.4 | −7.7 (s) |

In Example 25, a UV spectrum and a $^{31}$P-NMR spectrum are shown in FIGS. 14 and 15, respectively.
In Example 26, a UV spectrum and a $^{31}$P-NMR spectrum are shown in FIGS. 16 and 17, respectively.

TABLE 8

| Ex. | IR (cm$^{-1}$) | UV (nm) | $^1$H-NMR (ppm) |
|---|---|---|---|
| 27 | 965,895,846,773 (s) (m)(m)(s) | 310 (s) | 3.4 |
| 28 | 960,899,866,785 (m)(s) (w)(s) | 300,710 (s) (w) | 3.4 |
| 29 | 965,891,758 (m)(s) (m)) | 310,720 (s) (s) | 3.2 |
| 30 | 947,892,758 (m)(s) (m) | 315,710 (s) (s) | 3.4 |
| 31 | 945,870,805,775 (m)(m)(s) (s) | 310 (w) | 3.4 |
| 32 | 945,870,805,775 (m)(m)(s) (s) | 310 (m) | 3.4 |
| 33 | 945,870,805,775 (m)(m)(s) (s) | 320 (w) | 3.2 |

In Example 28, an IR spectrum, a UV spectrum and a $^1$H-NMR spectrum are shown in FIGS. 18, 19 and 20, respectively.
In Example 29, an IR spectrum and a UV spectrum are shown in FIGS. 21 and 22, respectively.

TABLE 9

| Comp. Ex. No. | Heteropolyacid Type | Amt. of heteropolyacid (g) | Amine Type | Amt. (g) | Molar ratio of amine/ heteropolyacid (charged) | Molybdenum concentration of suspension (wt %) |
|---|---|---|---|---|---|---|
| 1 | 50 wt % aqueous solution of $H_3[PMo_{12}O_{40}]\cdot 29H_2O$ | 100 | none | — | — | 7.2 |
| 2 | 50 wt % aqueous solution of $H_3[PMo_{12}O_{40}]\cdot 29H_2O$ | 100 | hexylamine $C_6H_{13}NH_2$ | 26 | 6 | 7.0 |
| 3 | 50 wt % aqueous solution of $H_3[PMo_{12}O_{40}]\cdot 29H_2O$ | 100 | octylamine $C_8H_{17}NH_2$ | 33 | 6 | 6.9 |

TABLE 9-continued

| Comp. Ex. No. | Heteropolyacid Type | Amt. of heteropolyacid (g) | Amine Type | Amt. (g) | Molar ratio of amine/ heteropolyacid (charged) | Molybdenum concentration of suspension (wt %) |
|---|---|---|---|---|---|---|
| 4 | 50 wt % aqueous solution of $H_3[PMo_{12}O_{40}]\cdot 29H_2O$ | 100 | dihexylamine $(C_6H_{13})_2NH$ | 48 | 6 | 6.8 |
| 5 | 50 wt % aqueous solution of $H_3[PMo_{12}O_{40}]\cdot 29H_2O$ | 100 | dioctylamine $(C_8H_{17})_2NH$ | 62 | 6 | 6.6 |
| 6 | 50 wt % aqueous solution of $H_3[PMo_{12}O_{40}]\cdot 29H_2O$ | 100 | tributylamine $(C_4H_9)_3N$ | 48 | 6 | 6.8 |
| 7 | 50 wt % aqueous solution of $H_4[SiMo_{12}O_{40}]\cdot 30H_2O$ | 100 | dibenzylamine $(C_6H_5CH_2)_2NH$ | 50 | 6 | 6.7 |
| 8 | 50 wt % aqueous solution of $H_4[SiMo_{12}O_{40}]\cdot 30H_2O$ | 100 | N-cetylpyridinium chloride $[\pi\text{-}C_5H_5N(CH_2)_{15}CH_3]Cl$ | 48 | 3.3 | 6.8 |
| 9 | 30 wt % aqueous solution of $H_3[PW_{12}O_{40}]\cdot 29H_2O$ | 30 | dioleylamine $(C_{18}H_{35})_2NH$ | 27 | 6 | 5.5 |
| 10 | 30 wt % aqueous solution of $H_3[PW_{12}O_{40}]\cdot 29H_2O$ | 30 | tridecylamine $(C_{12}H_{25})_3N$ | 16 | 3.5 | 5.7 |

TABLE 10

| | Example No. | | | | | | | | | |
|---|---|---|---|---|---|---|---|---|---|---|
| | 38 | 39 | 40 | 41 | 42 | 43 | 44 | 45 | 46 | 47 |
| Feedstock oil | Vacuum distillation residue of Khafji crude oil (b.p. 520° C. or above: 95.0 wt %) | | | | | | | | | |
| Conditions for hydroconversion | 460° C., 60 min, 140 kg/cm² (charged hydrogen pressure at room temperature) | | | | | | | | | |
| Type of molybdenum compound for hydroconversion | Example No. | | | | | | | | | |
| | 1 | 2 | 3 | 4 | 5 | 6 | 7 | 8 | 9 | 10 |
| Concentration of molybdenum compound in feedstock oil | concentration of molybdenum per se 150 ppmw | | | | | | | | | |
| Chemical hydrogen consumption (wt %) | 2.3 | 2.2 | 2.2 | 2.3 | 2.3 | 2.2 | 2.2 | 2.2 | 2.2 | 2.3 |
| Components of product (wt %) | | | | | | | | | | |
| Gas | 12.8 | 12.3 | 12.3 | 12.2 | 12.9 | 12.3 | 12.3 | 11.2 | 11.4 | 13.0 |
| Fractions of from IBP*¹ to 520° C. | 76.0 | 75.9 | 76.2 | 76.2 | 75.4 | 75.8 | 76.1 | 76.6 | 76.7 | 76.0 |
| Fractions of 520° C. or above | 13.5 | 14.0 | 13.7 | 13.9 | 14.0 | 14.1 | 13.8 | 14.4 | 14.1 | 13.3 |
| Oil | 9.6 | 10.3 | 9.8 | 10.0 | 10.3 | 10.5 | 9.9 | 11.5 | 10.8 | 9.4 |
| Asphaltene | 3.0 | 2.9 | 3.1 | 3.2 | 3.0 | 2.9 | 3.1 | 2.4 | 2.7 | 3.0 |
| Coke | 0.9 | 0.8 | 0.8 | 0.7 | 0.7 | 0.7 | 0.8 | 0.5 | 0.6 | 0.9 |
| Conversion*² (wt %) | 85.8 | 85.3 | 85.6 | 85.4 | 85.3 | 85.2 | 85.5 | 84.8 | 85.2 | 86.0 |
| Coking on the inner wall of the autoclave | not observed | | | | | | | | | |

*¹IBP: Initial Boiling Point
*²Conversion: Hydroconversion ratio defined hereinbefore

TABLE 11

| | Example No. | | | | | | | | | |
|---|---|---|---|---|---|---|---|---|---|---|
| | 48 | 49 | 50 | 51 | 52 | 53 | 54 | 55 | 56 | 57 |
| Feedstock oil | Vacuum distillation residue of Khafji crude oil (b.p. 520° C. or above: 95.0 wt %) | | | | | | | | | |
| Conditions for hydroconversion | 460° C., 60 min, 140 kg/cm² (charged hydrogen pressure at room temperature) | | | | | | | | | |
| Type of molybdenum compound for hydroconversion | Example No. | | | | | | | | | |
| | 11 | 12 | 13 | 14 | 15 | 16 | 17 | 18 | 19 | 20 |
| Concentration of molybdenum compound in feedstock oil | concentration of molybdenum per se 150 ppmw | | | | | | | | | |
| Chemical hydrogen consumption (wt %) | 2.3 | 2.2 | 2.2 | 2.1 | 2.1 | 2.1 | 2.1 | 2.1 | 2.2 | 2.2 |
| Components of product (wt %) | | | | | | | | | | |
| Gas | 12.9 | 12.5 | 11.8 | 11.5 | 10.8 | 10.7 | 10.8 | 10.9 | 12.0 | 12.2 |
| Fractions of from IBP to 520° C. | 76.0 | 75.9 | 76.0 | 75.6 | 76.1 | 76.3 | 76.0 | 76.2 | 76.1 | 76.0 |
| Fractions of 520° C. or above | 13.4 | 13.8 | 14.4 | 15.0 | 15.2 | 15.1 | 15.3 | 15.0 | 14.1 | 14.0 |
| Oil | 9.4 | 10.0 | 11.2 | 12.1 | 12.4 | 12.4 | 12.7 | 12.2 | 10.5 | 10.4 |
| Asphaltene | 3.1 | 3.0 | 2.6 | 2.4 | 2.4 | 2.4 | 2.3 | 2.4 | 2.8 | 2.7 |
| Coke | 0.9 | 0.8 | 0.6 | 0.5 | 0.4 | 0.3 | 0.3 | 0.4 | 0.8 | 0.9 |
| Conversion (wt %) | 85.9 | 85.5 | 84.8 | 84.2 | 84.0 | 84.1 | 83.9 | 84.2 | 85.2 | 85.3 |
| Coking on the inner wall of the autoclave | not observed | | | | | | | | | |

TABLE 12

| | Example No. | | | | | | | | | | | |
|---|---|---|---|---|---|---|---|---|---|---|---|---|
| | 58 | 59 | 60 | 61 | 62 | 63 | 64 | 65 | 66 | 67 | 81 | 82 |
| Feedstock oil | Vacuum distillation residue of Khafji crude oil (b.p. 520° C. or above: 95.0 wt %) | | | | | | | | | | | |
| Conditions for hydroconversion | 460° C., 60 min, 140 kg/cm² (charged hydrogen pressure at room temperature) | | | | | | | | | | | |
| | Example No. | | | | | | | | | | | |
| Type of molybdenum compound for hydroconversion | 21 | 22 | 23 | 24 | 25 | 26 | 27 | 28 | 29 | 30 | 79 | 80 |
| Concentration of molybdenum compound in feedstock oil | concentration of molybdenum per se 150 ppmw | | | | | | | | | | | |
| Chemical hydrogen consumption (wt %) | 2.2 | 2.1 | 2.1 | 2.1 | 2.1 | 2.1 | 2.1 | 2.1 | 2.3 | 2.1 | 2.1 | 2.1 |
| Components of product (wt %) | | | | | | | | | | | | |
| Gas | 11.8 | 11.4 | 10.9 | 10.8 | 10.9 | 11.0 | 10.8 | 11.2 | 11.7 | 10.9 | 10.9 | 11.0 |
| Fractions of from IBP to 520° C. | 75.9 | 76.0 | 75.9 | 76.1 | 75.9 | 75.6 | 76.2 | 76.0 | 76.5 | 75.8 | 75.8 | 75.8 |
| Fractions of 520° C. or above | 14.5 | 14.7 | 15.3 | 15.2 | 15.3 | 15.5 | 15.1 | 14.9 | 14.1 | 15.4 | 15.4 | 15.3 |
| Oil | 11.2 | 11.7 | 12.7 | 12.4 | 12.5 | 12.7 | 12.4 | 11.8 | 11.2 | 12.6 | 12.8 | 12.5 |
| Asphaltene | 2.6 | 2.5 | 2.2 | 2.4 | 2.5 | 2.4 | 2.3 | 2.7 | 2.5 | 2.4 | 2.2 | 2.4 |
| Coke | 0.7 | 0.5 | 0.4 | 0.4 | 0.3 | 0.4 | 0.4 | 0.4 | 0.4 | 0.4 | 0.4 | 0.4 |
| Conversion (wt %) | 84.7 | 84.5 | 83.9 | 84.0 | 83.9 | 83.7 | 84.1 | 84.3 | 85.2 | 83.8 | 83.8 | 83.9 |
| Coking on the inner wall of the autoclave | not observed | | | | | | | | | | | |

TABLE 13

| | Example No. | | | | | | | | | | | | |
|---|---|---|---|---|---|---|---|---|---|---|---|---|---|
| | 68 | 69 | 70 | 71 | 72 | 73 | 74 | 31 | 32 | 33 | 34 | 35 | 36 | 37 |
| Feedstock oil | Vacuum distillation residue of a Khafji crude oil (b.p. 520° C. or above: 95.0 wt %) | | | | | | | | | | | | |
| Conditions for hydroconversion | 460° C., 60 min, 140 kg/cm² (charged hydrogen pressure at room temperature) | | | | | | | | | | | | |
| Type of molybdenum compound for hydroconversion | | | | | | | | 31 | 32 | 33 | 34 | 35 | 36 | 37 |
| Concentration of molybdenum compound in feedstock oil | concentration of molybdenum per se 150 ppmw | | | | | | | | | | | | |
| Chemical hydrogen consumption (wt %) | | | | | | | | 2.1 | 2.2 | 2.1 | 2.1 | 2.1 | 2.1 | 2.1 |
| Components of product (wt %) | | | | | | | | | | | | | |
| Gas | | | | | | | | 11.1 | 11.8 | 11.4 | 10.7 | 10.8 | 11.2 | 10.8 |
| Fractions of from IBP to 520° C. | | | | | | | | 76.0 | 76.1 | 76.2 | 76.1 | 76.1 | 75.9 | 76.0 |
| Fractions of 520° C. or above | | | | | | | | 15.0 | 14.3 | 14.5 | 15.4 | 15.2 | 15.0 | 15.3 |
| Oil | | | | | | | | 12.1 | 11.0 | 11.6 | 12.6 | 12.3 | 12.1 | 12.6 |
| Asphaltene | 2.6 | 2.8 | 2.5 | 2.4 | 2.5 | 2.5 | 2.3 | | | | | | | |
| Coke | 0.3 | 0.5 | 0.4 | 0.4 | 0.4 | 0.4 | 0.4 | | | | | | | |
| Conversion (wt %) | 84.2 | 85.0 | 84.7 | 83.8 | 84.0 | 84.2 | 83.9 | | | | | | | |
| Coking on the inner wall of the autoclave | not observed | | | | | | | | | | | | |

TABLE 14

| | Comparative Example No. | | | | | | | | | |
|---|---|---|---|---|---|---|---|---|---|---|
| | 11 | 12 | 13 | 14 | 15 | 16 | 17 | 18 | 19 | 20 |
| Feedstock oil | Vacuum distillation residue of a Khafji crude oil (b.p. 520° C. or above: 95.0 wt %) | | | | | | | | | |
| Conditions for hydroconversion | 460° C., 60 min, 140 kg/cm² (charged hydrogen pressure at room temperature) | | | | | | | | | |
| | Comparative Example No. | | | | | | | | | |
| Type of molybdenum compound for hydroconversion | 1 | 2 | 3 | 4 | 5 | 6 | 7 | 8 | 9 | 10 |
| Concentration of molybdenum compound in feedstock oil | concentration of molybdenum per se 150 ppmw | | | | | | | | | |
| Chemical hydrogen consumption (wt %) | 1.9 | 1.9 | 2.0 | 2.0 | 2.2 | 1.7 | 1.6 | 1.6 | 1.4 | 1.4 |
| Components of product (wt %) | | | | | | | | | | |
| Gas | 13.5 | 13.7 | 13.1 | 13.4 | 12.8 | 14.1 | 14.1 | 14.3 | 14.8 | 14.8 |
| Asphaltene | 7.2 | 7.4 | 6.2 | 6.8 | 4.4 | 8.0 | 7.8 | 8.2 | 7.7 | 7.8 |
| Coke | 2.5 | 2.4 | 1.8 | 2.1 | 1.4 | 3.3 | 4.0 | 3.9 | 4.5 | 4.6 |
| Coking on the inner wall of the autoclave | observed | | | | | | | | | |

TABLE 15

| | Example 75 | Example 76 |
|---|---|---|
| Feedstock oil | Vacuum distillation residue of Khafji crude oil (b.p. 520° C. or above: 95.0 wt %) | |
| Conditions for hydroconversion | One-through reaction 485° C., 30 min, 200 kg/cm² 1000 N.liter/liter (H₂/oil) | |
| Type of molybdenum compound for hydroconversion | Example 15 | Example 17 |
| Molybdenum concentration in feedstock oil | 150 ppmw (Mo per se) | 150 ppmw (Mo per se) |
| Type and concentration of additive | silica powder (0.8 wt %) | |
| Chemical hydrogen consumption (wt %) | 2.4 | 2.4 |
| Components of | | |

TABLE 15-continued

|  | Example 75 | Example 76 |
|---|---|---|
| product (wt %) | | |
| Gas | 14.2 | 13.5 |
| Fractions of from IBP to 343° C. | 48.2 | 47.1 |
| Fractions of from 343° C. to 520° C. | 29.9 | 30.7 |
| Fractions of 520° C. or above | 10.1 | 11.1 |
| Oil | 7.7 | 9.0 |
| Asphaltene | 2.0 | 1.8 |
| Coke | 0.4 | 0.3 |
| Conversion (wt %) | 89.4 | 88.3 |
| Coking in the reaction vessel | 43 ppmw per amount of charged feedstock | 32 ppmw per amount of charged feedstock |
| S content of product oil (wt %) | | |
| Fractions of from IBP to 343° C. | 1.02 | 0.91 |
| Fractions of from 343° C. to 520° C. | 2.56 | 2.28 |
| Fractions of 520° C. or above | 4.18 | 3.31 |
| N content of product oil (wt %) | | |
| Fractions of from IBP to 343° C. | 0.10 | 0.10 |
| Fractions of from 343° C. to 520° C. | 0.38 | 0.36 |
| Fractions of 520° C. or above | 0.70 | 0.61 |

TABLE 16

|  | Example 77 | Example 78 |
|---|---|---|
| Feedstock oil | Vacuum distillation residue of a Khafji crude oil (b.p. 520° C. or above: 95.0 wt %) | |
| Conditions for hydroconversion | recycle reaction 478° C., 30 min, 200 kg/cm² 1000 N.liter/liter (H₂/oil) recycling ratio 0.4 | |
| Type of molybdenum compound for hydroconversion | Example 25 | Example 29 |
| Molybdenum concentration in feedstock oil | 40 ppmw (Mo per se) | 40 ppmw (Mo per se) |
| Type and concentration of additive | carbon black power (0.3 wt %) | |
| Chemical hydrogen consumption (wt %) | 2.5 | 2.5 |
| Components of product (wt %) | | |
| Gas | 14.2 | 13.5 |
| Fractions of from IBP to 343° C. | 45.8 | 43.3 |
| Fractions of from 343° C. to 520° C. | 34.0 | 36.3 |
| Fractions of 520° C. or above | 8.5 | 9.4 |
| Oil | 5.1 | 5.8 |
| Asphaltene | 3.0 | 3.3 |
| Coke | 0.4 | 0.3 |
| Conversion (wt %) | 91.1 | 90.1 |
| Coking in the reaction vessel | 33 ppmw per amount of charged feedstock | 38 ppmw per amount of charged feedstock |
| S content of product oil (wt %) | | |
| Fractions of from IBP to 343° C. | 0.93 | 1.07 |
| Fractions of from 343° C. to 520° C. | 2.04 | 2.16 |
| Fractions of 520° C. or above | 5.56 | 5.72 |
| N content of product oil (wt %) | | |
| Fractions of from IBP to 343° C. | 0.10 | 0.11 |
| Fractions of from 343° C. to 520° C. | 0.33 | 0.31 |
| Fractions of 520° C. or above | 0.83 | 0.79 |

TABLE 17

| Ex. No. | Molybdenum compound obtained |
|---|---|
| 1 | $[C_{18}H_{37}NH_3]_3[PMo_{12}O_{40}]$ |
| 2 | $[C_{22}H_{45}NH_3]_3[PMo_{12}O_{40}]$ |
| 3 | $[C_{18}H_{37}NH_3]_4[SiMo_{12}O_{40}]$, $[C_{18}H_{37}NH_3]_6[SiMo_{12}O_{40}]$ |
| 4 | $[C_{18}H_{37}(CH_3)_2NH]_4[SiMo_{12}O_{40}]$ |
| 5 | $[C_{16}H_{33}CH_3NH_2]_5[PMo_{12}O_{40}]$, $[C_{16}H_{33}CH_3NH_2]_3[PMo_9O_{31}(OH_2)_3]$, $[C_{16}H_{33}CH_3NH_2]_6[P_2Mo_{18}O_{62}]$ |
| 6 | $[C_{16}H_{33}CH_3NH_2]_5[PMo_{12}O_{40}]$, $[C_{16}H_{33}CH_3NH_2]_3[PMo_9O_{31}(OH_2)_3]$, $[C_{16}H_{33}CH_3NH_2]_6[P_2Mo_{18}O_{62}]$ |
| 7 | $[C_{30}H_{61}NH_3]_8[CeMo_{12}O_{42}]$ |
| 8 | $[(C_{22}H_{41})_2NH_2]_{12}[SiMo_9V_3O_{40}]$ |
| 9 | $[(C_{18}H_{35})_2NH_2]_4[SiMo_9W_3O_{40}]$, $[(C_{18}H_{35})_2NH_2]_6[SiMo_9W_3O_{40}]$ |
| 10 | $[C_{10}H_{21}(CH_3)_2NH]_3[CoMo_6O_{24}H_6]$ |
| 11 | $[C_{20}H_{41}NH_3]_3[PMo_{12}O_{40}]$, $[C_{20}H_{41}NH_3]_6[P_2Mo_{18}O_{62}]$ |
| 12 | $[(C_{10}H_{21})_2NH_2]_3[PMo_{12}O_{40}]$, $[(C_{10}H_{21})_2NH_2]_5[PMo_{12}O_{40}]$, $[(C_{10}H_{21})_2NH_2]_3[PMo_9O_{31}(OH_2)_3]$, $[(C_{10}H_{21})_2NH_2]_6[P_2Mo_{18}O_{62}]$ |
| 13 | $[(C_{12}H_{25})_2NH_2]_5[PMo_{12}O_{40}]$, $[(C_{12}H_{25})_2NH_2]_3[PMo_9O_{31}(OH_2)_3]$, $[(C_{12}H_{25})_2NH_2]_6[P_2Mo_{18}O_{62}]$ |
| 14 | $[(C_{16}H_{33})_2NH_2]_5[PMo_{12}O_{40}]$, $[(C_{16}H_{33})_2NH_2]_3[PMo_9O_{31}(OH_2)_3]$, $[(C_{16}H_{33})_2NH_2]_6[P_2Mo_{18}O_{62}]$ |
| 15 | $[(C_{18}H_{35})_2NH_2]_3[PMo_{12}O_{40}]$ |
| 16 | $[(C_{18}H_{35})_2NH_2]_3[PMo_{12}O_{40}]$, $[(C_{18}H_{35})_2NH_2]_5[PMo_{12}O_{40}]$, $[(C_{18}H_{35})_2NH_2]_3[PMo_9O_{31}(OH_2)_3]$, $[(C_{18}H_{35})_2NH_2]_6[P_2Mo_{18}O_{62}]$ |
| 17 | $[(C_{18}H_{35})_2NH_2]_5[PMo_{12}O_{40}]$, $[(C_{18}H_{35})_2NH_2]_3[PMo_9O_{31}(OH_2)_3]$, $[(C_{18}H_{35})_2NH_2]_6[P_2Mo_{18}O_{62}]$ |
| 18 | $[(C_{18}H_{35})_2NH_2]_3[PMo_9O_{31}(OH_2)_3]$ |
| 19 | $[(C_{10}H_{21})_3NH]_5[PMo_{12}O_{40}]$, $[(C_{10}H_{21})_3NH]_3[PMo_9O_{31}(OH_2)_3]$, $[(C_{10}H_{21})_3NH]_6[P_2Mo_{18}O_{62}]$ |
| 20 | $[(C_{10}H_{21})_3NH]_5[PMo_{12}O_{40}]$, $[(C_{10}H_{21})_3NH]_3[PMo_9O_{31}(OH_2)_3]$ |
| 21 | $[(C_{12}H_{25})_3NH]_3[PMo_{12}O_{40}]$ |
| 22 | $[(C_{12}H_{25})_3NH]_5[PMo_{12}O_{40}]$, $[(C_{12}H_{25})_3NH]_3[PMo_9O_{31}(OH_2)_3]$, $[(C_{12}H_{25})_3NH]_6[P_2Mo_{18}O_{62}]$ |
| 23 | $[(C_{16}H_{33})_3NH]_5[PMo_{12}O_{40}]$, $[(C_{16}H_{33})_3NH]_3[PMo_9O_{31}(OH_2)_3]$, $[(C_{12}H_{25})_3NH]_6[P_2Mo_{18}O_{62}]$ |
| 24 | $[(C_{12}H_{25})_3NH]_5[PMo_{12}O_{40}]$, $[(C_{12}H_{25})_3NH]_3[PMo_9O_{31}(OH_2)_3]$, $[(C_{12}H_{25})_3NH]_6[P_2Mo_{18}O_{62}]$ |
| 25 | $[(C_{18}H_{35})_2NH_2]_5[PMo_{12}O_{40}]$, $[(C_{18}H_{35})_2NH]_3[PMo_9O_{31}(OH_2)_3]$, $[(C_{18}H_{35})_2NH_2]_6[P_2Mo_{18}O_{62}]$, $[(C_{18}H_{35})_2NH_2]_8[P_2Mo_{18}O_{62}]$ |
| 26 | $[(C_{18}H_{35})_2NH_2]_{10}[P_2Mo_{18}O_{62}]$ |
| 27 | $[(C_{20}H_{41})_2NH_2]_3[AsMo_{12}O_{40}]$ |
| 28 | $[(C_{18}H_{37})_2NH_2]_4[SiMo_{12}O_{40}]$ |
| 29 | $[(C_{14}H_{29})_2NH_2]_6[SiMo_{12}O_{40}]$, $[(C_{14}H_{29})_2NH_2]_8[SiMo_{12}O_{40}]$ |
| 30 | $[(C_{16}H_{31})_3NH]_4[SiMo_{12}O_{40}]$, $[(C_{16}H_{31})_3NH]_6[SiMo_{12}O_{40}]$ |
| 31 | $[(C_{18}H_{35})_2NH_2]_4[GeMo_{12}O_{40}]$ |
| 32 | $[(C_{18}H_{35})_2NH_2]_4[GeMo_{12}O_{40}]$ |
| 33 | $[(C_{16}H_{33})_3NH]_4[GeMo_{12}O_{40}]$ |
| 34 | $[(C_{18}H_{35})_2NH_2]_3[PMo_{12}O_{40}]$ |
| 35 | $[(C_{22}H_{43})_2NH_2]_3[PMo_{12}O_{40}]$, $[(C_{22}H_{43})_2NH_2]_6[P_2Mo_{18}O_{62}]$ |
| 36 | $[(C_{18}H_{35})_3NH]_3[PMo_{12}O_{40}]$, $[(C_{18}H_{35})_3NH]_6[P_2Mo_{18}O_{62}]$ |

TABLE 17-continued

| Ex. No. | Molybdenum compound obtained |
|---|---|
| 37 | $[(C_{18}H_{35})_2NH_2]_3[PMo_{12}O_{40}]$, $[(C_{18}H_{35})_3NH]_6[P_2Mo_{18}O_{62}]$ |
| 79 | $[(C_{12}H_{25})_3NH]_3H_2[PMo_{12}O_{40}]$ |
| 80 | $[(C_{18}H_{35})_2NH_2]_6H_4[P_2Mo_{18}O_{62}]$ |

What is claimed is:

1. An oleophilic molybdenum compound for use in hydroconversion of a hydrocarbon, represented by the formula:

$$[(R^1)(R^2)(R^3)NH]_xH_y[A] \quad (I)$$

wherein $R^1$ represents an aliphatic hydrocarbon residue having 10 to 46 carbon atoms, each of $R^2$ and $R^3$ independently represents a hydrogen atom or an aliphatic hydrocarbon residue having 1 to 46 carbon atoms, A represents a heteropolyanion group containing at least one molybdenum atom as a polyatom, x is an integer of from 3 to 14, and y is an integer of from 0 to 11, wherein said heteropolyanion group is at least one member selected from the group consisting of a heteropolymolybdate anion, a mixed heteropolymolybdate anion containing at least one molybdenum atom and at least one non-molybdenum transition metal atom as polyatoms at a ratio of the number of molybdenum atoms to the total number of polyatoms of at least 0.7, and an electron reduced species of said heteropolymolybdate anion or said mixed heteropolymolybdate anion.

2. The compound according to claim 1, wherein A represents a heteropolymolybdate anion.

3. The compound according to claim 1, wherein said $R^1$ represents an aliphatic hydrocarbon residue having 10 to 30 carbon atoms.

4. The compound according to claim 1, wherein each of said $R^2$ and said $R^3$ independently represents an aliphatic hydrocarbon residue having 1 to 30 carbon atoms.

5. The compound according to claim 1, wherein said $R^2$ is an aliphatic hydrocarbon residue having 10 to 46 carbon atoms and said $R^3$ is a hydrogen atom.

6. The compound according to claim 1, wherein said $R^2$ is an aliphatic hydrocarbon residue having 10 to 46 carbon atoms and said $R^3$ is an aliphatic hydrocarbon residue having 1 to 46 carbon atoms.

7. The compound according to claim 1, which exhibits an absorption peak ascribed to a stretching vibration between a molybdenum atom and an oxygen atom within each of the ranges of 975–900 cm$^{-1}$, 895–830 cm$^{-1}$ and 830–710 cm$^{-1}$ in an infrared absorption spectrum.

8. The compound according to claim 1, which exhibits at least one absorption peak selected from a peak ascribed to a yellow color of the heteropolyanion and occurring within the range of 300–400 nm in an ultraviolet-visible light absorption spectrum and a peak ascribed to a blue color of the reduced heteropolyanion and occurring within the range of 650–900 nm in an ultraviolet-visible light absorption spectrum.

9. The compound according to claim 1, which exhibits a proton signal ascribed to a methylene group bonded directly to the nitrogen atom within the range of 3.2–3.8 ppm, in terms of δ ppm, in a proton nuclear magnetic resonance spectrum.

10. The compound according to claim 1, wherein said A is a phosphorus polymolybdate anion, said compound exhibiting a phosphorus signal within the range of +1.0 to −8.0 ppm in a phosphorus nuclear magnetic resonance spectrum taken using an 85% by weight aqueous phosphoric acid solution as an external standard with respect to a toluene solution of said compound.

* * * * *